（12） United States Patent
Hasejima et al.

(10) Patent No.: US 11,292,521 B2
(45) Date of Patent: Apr. 5, 2022

(54) AUTONOMOUS DRIVING CONTROL DEVICE AND AUTONOMOUS DRIVING PATH COMPUTATION METHOD

(71) Applicant: CLARION CO., LTD., Saitama (JP)

(72) Inventors: Noriyasu Hasejima, Tokyo (JP); Takehito Ogata, Tokyo (JP); Shinya Tagawa, Saitama (JP); Makoto Ishinoda, Saitama (JP)

(73) Assignee: CLARION CO., LTD., Saitama (JP)

( * ) Notice: Subject to any disclaimer, the term of this patent is extended or adjusted under 35 U.S.C. 154(b) by 125 days.

(21) Appl. No.: 16/656,502

(22) Filed: Oct. 17, 2019

(65) Prior Publication Data

US 2020/0122775 A1  Apr. 23, 2020

(30) Foreign Application Priority Data

Oct. 18, 2018 (JP) .............................. JP2018-196325

(51) Int. Cl.
*B62D 15/02* (2006.01)
*B60K 31/00* (2006.01)
(Continued)

(52) U.S. Cl.
CPC ...... *B62D 15/0285* (2013.01); *B60K 31/0075* (2013.01); *B60W 30/06* (2013.01); *B60W 40/107* (2013.01); *G05D 1/0223* (2013.01)

(58) Field of Classification Search
CPC ........... B62D 15/0285; B60K 31/0075; B60W 30/06; B60W 40/107; G05D 1/0223
See application file for complete search history.

(56) References Cited

U.S. PATENT DOCUMENTS

2005/0021203 A1  1/2005  Iwazaki et al.
2016/0075329 A1  3/2016  Tomozawa et al.
(Continued)

FOREIGN PATENT DOCUMENTS

EP    1491979 A1 * 12/2004 ......... B62D 15/0285
JP    2005-014775 A    1/2005
(Continued)

OTHER PUBLICATIONS

Extended European Search Report dated Mar. 3, 2020 for the European Patent Application No. 19203856.0.

*Primary Examiner* — Jeff A Burke
*Assistant Examiner* — Mohamad O El Sayah
(74) *Attorney, Agent, or Firm* — Volpe Koenig

(57) ABSTRACT

An autonomous driving control device and an autonomous driving path computation method capable of computing a driving path without extremely changing a movement of a steering wheel during autonomous driving. A parking control device computes a parking path for automatically parking a vehicle, and includes an acceleration section transition curve computing unit that computes an acceleration section transition curve based on a target steering speed set in advance and an acceleration section target vehicle speed, a deceleration section transition curve computing unit that computes a deceleration section transition curve based on the target steering speed and a deceleration target vehicle speed, and a parking path computing unit that computes a parking path using the acceleration section transition curve and the deceleration section transition curve. The parking path is computed by setting the deceleration section target vehicle speed faster than the acceleration section target vehicle speed.

11 Claims, 22 Drawing Sheets

(51) Int. Cl.
 _B60W 30/06_ (2006.01)
 _B60W 40/107_ (2012.01)
 _G05D 1/02_ (2020.01)

(56) References Cited

U.S. PATENT DOCUMENTS

| | | | | |
|---|---|---|---|---|
| 2016/0288785 A1* | 10/2016 | Ezoe | ............... | B60W 30/18145 |
| 2018/0265079 A1* | 9/2018 | Nakada | ................. | B60W 40/04 |
| 2019/0061740 A1* | 2/2019 | Ohira | .................... | B60W 30/06 |

FOREIGN PATENT DOCUMENTS

| | | |
|---|---|---|
| WO | 2006/050710 A1 | 5/2006 |
| WO | 2017/183486 A1 | 10/2017 |

* cited by examiner

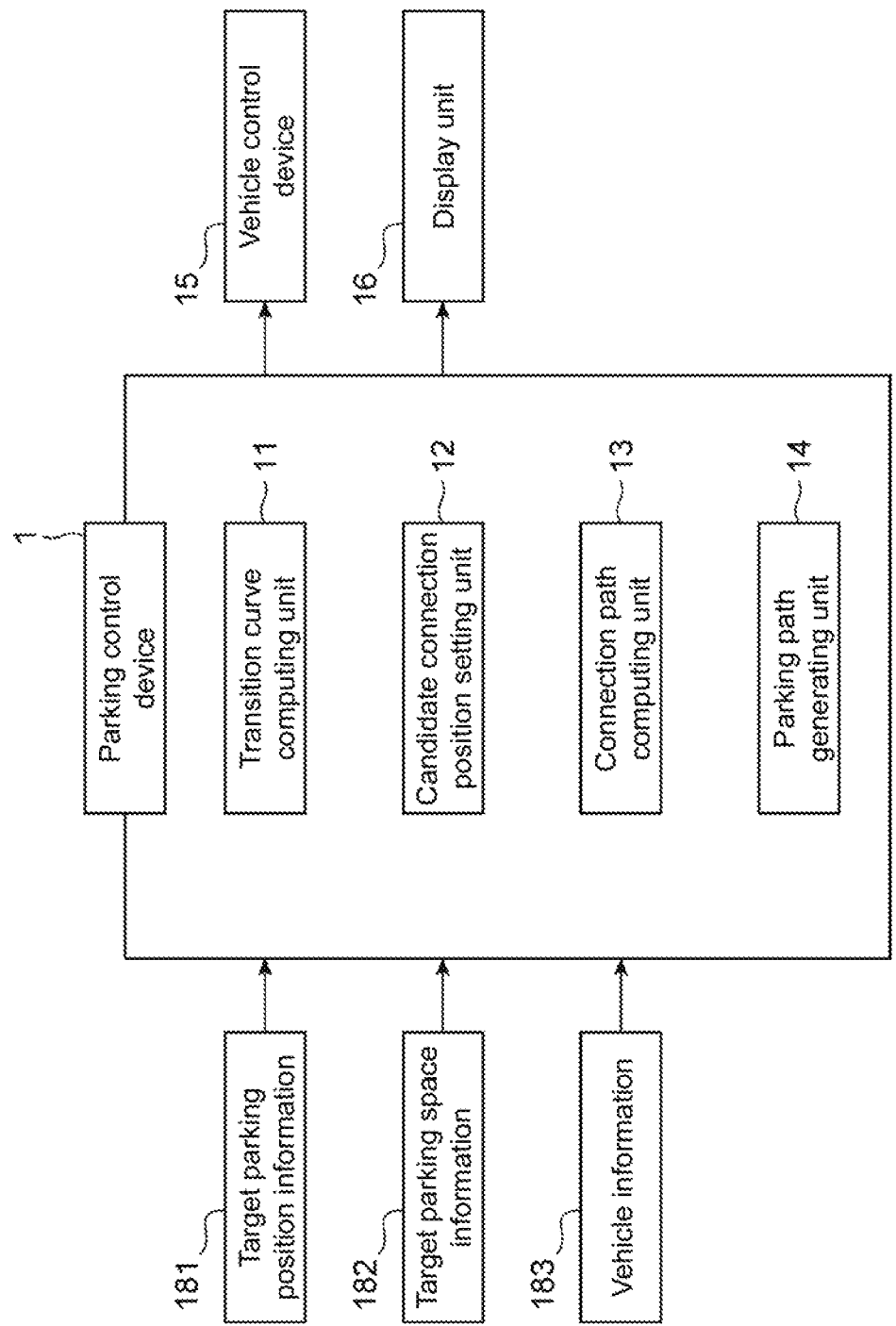

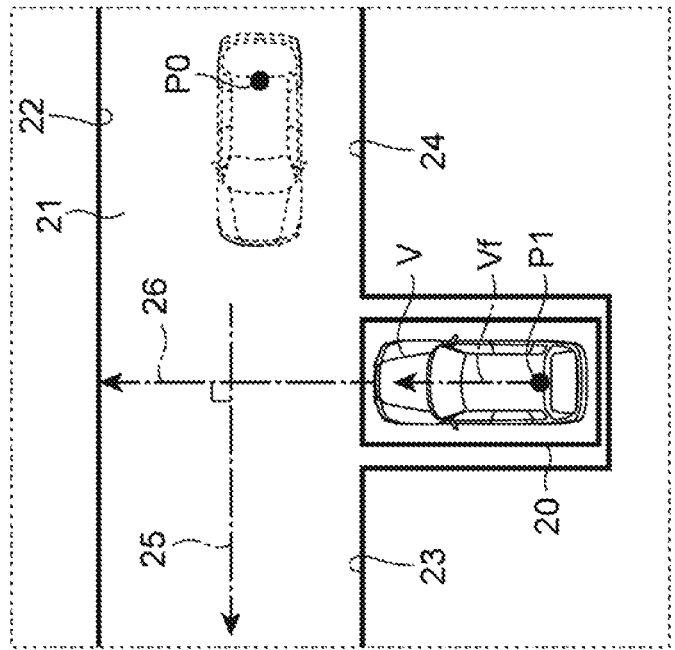
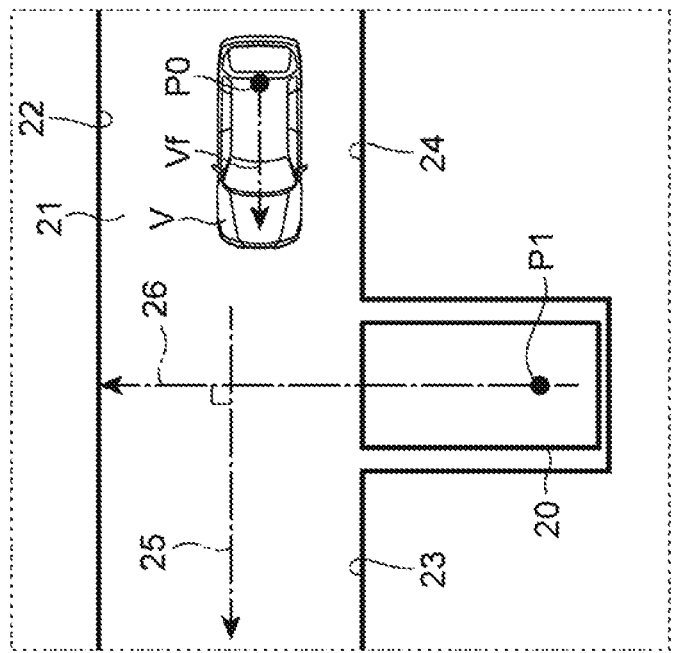

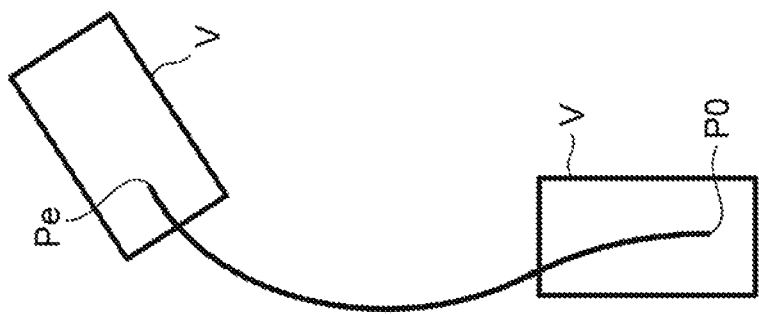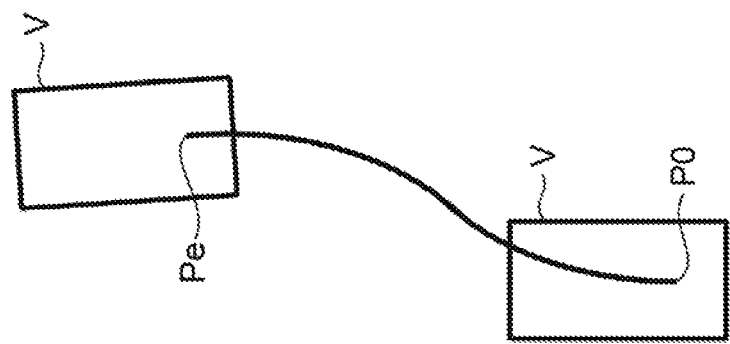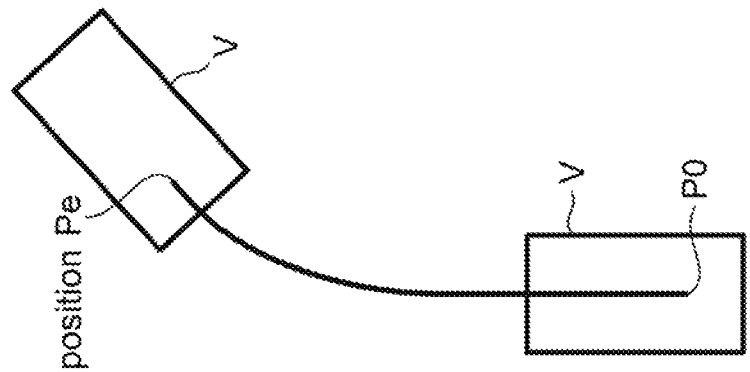

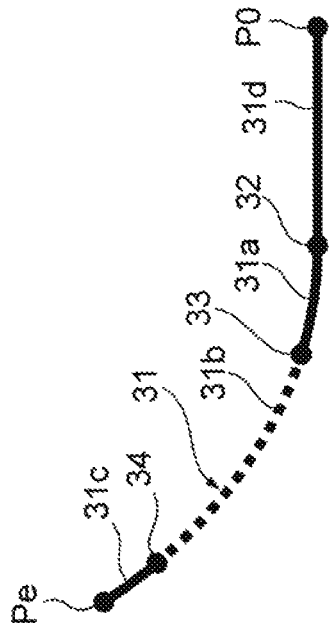
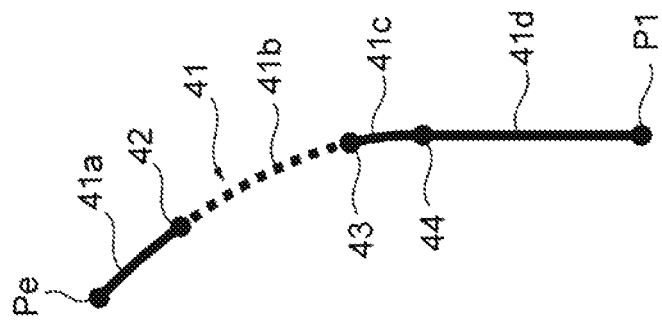
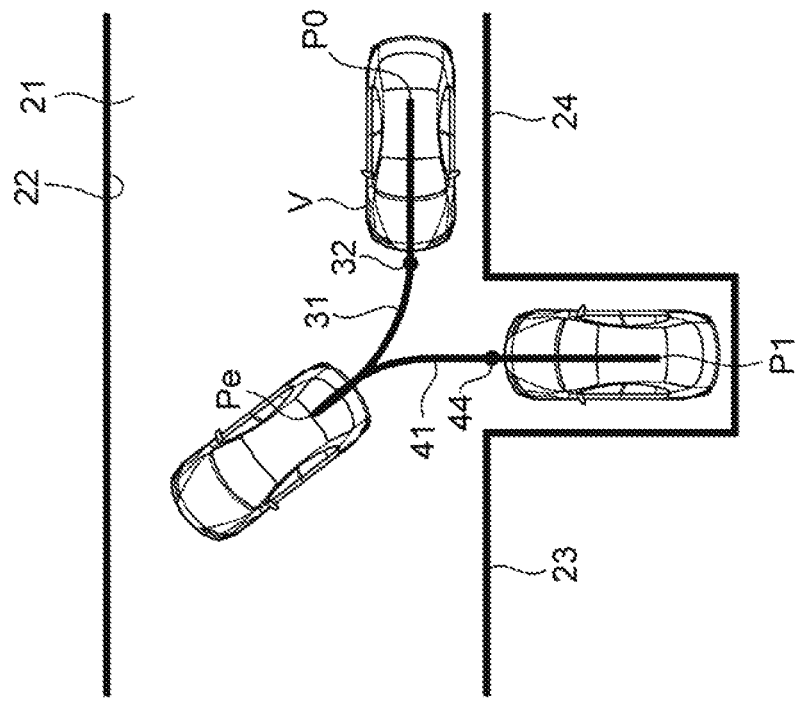

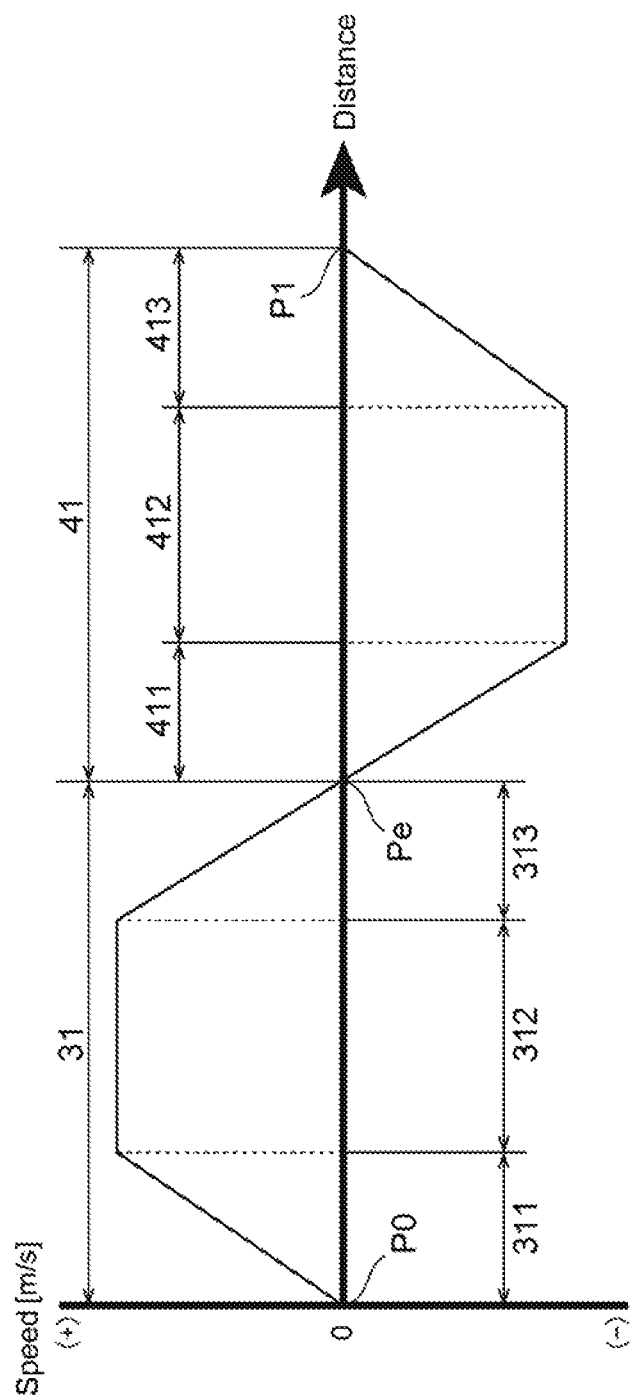

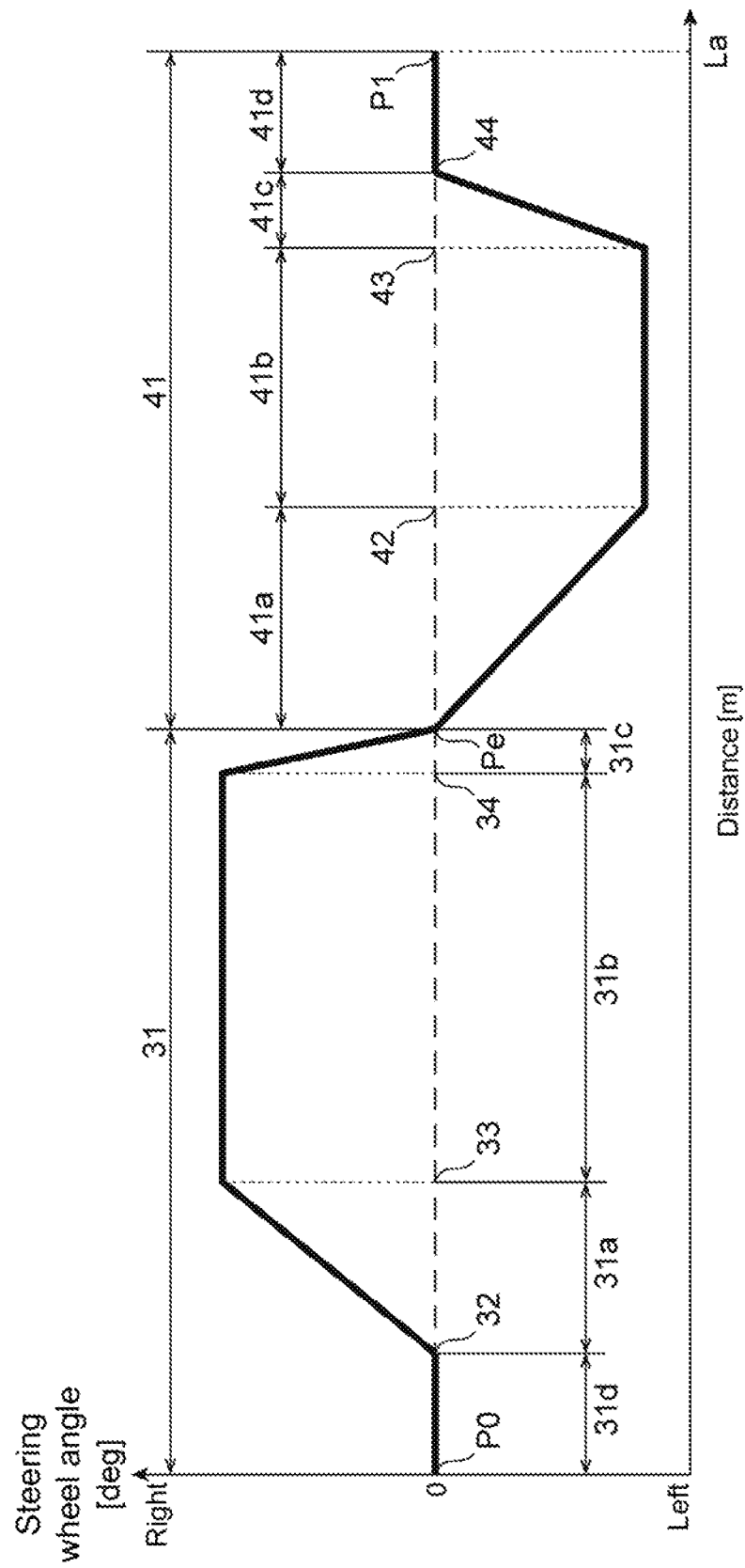

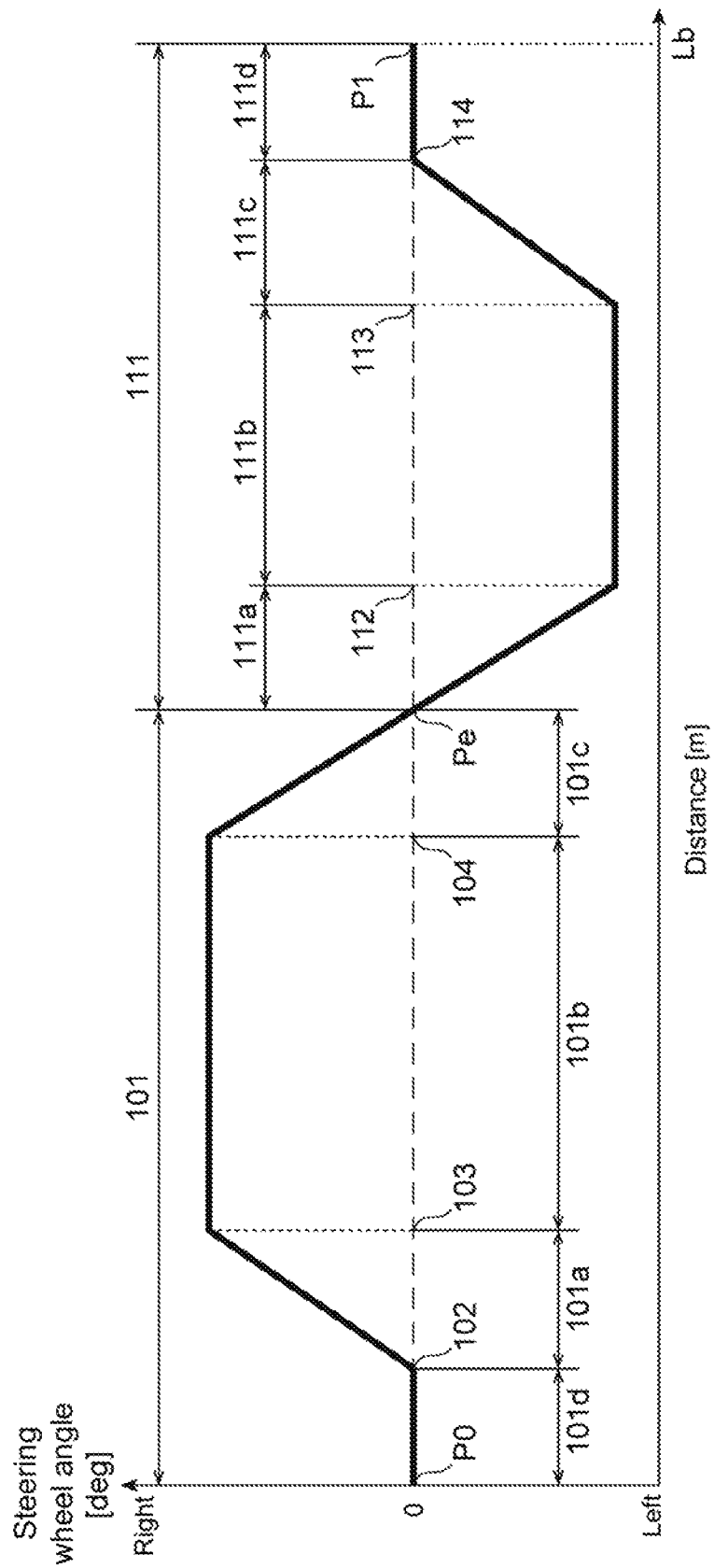

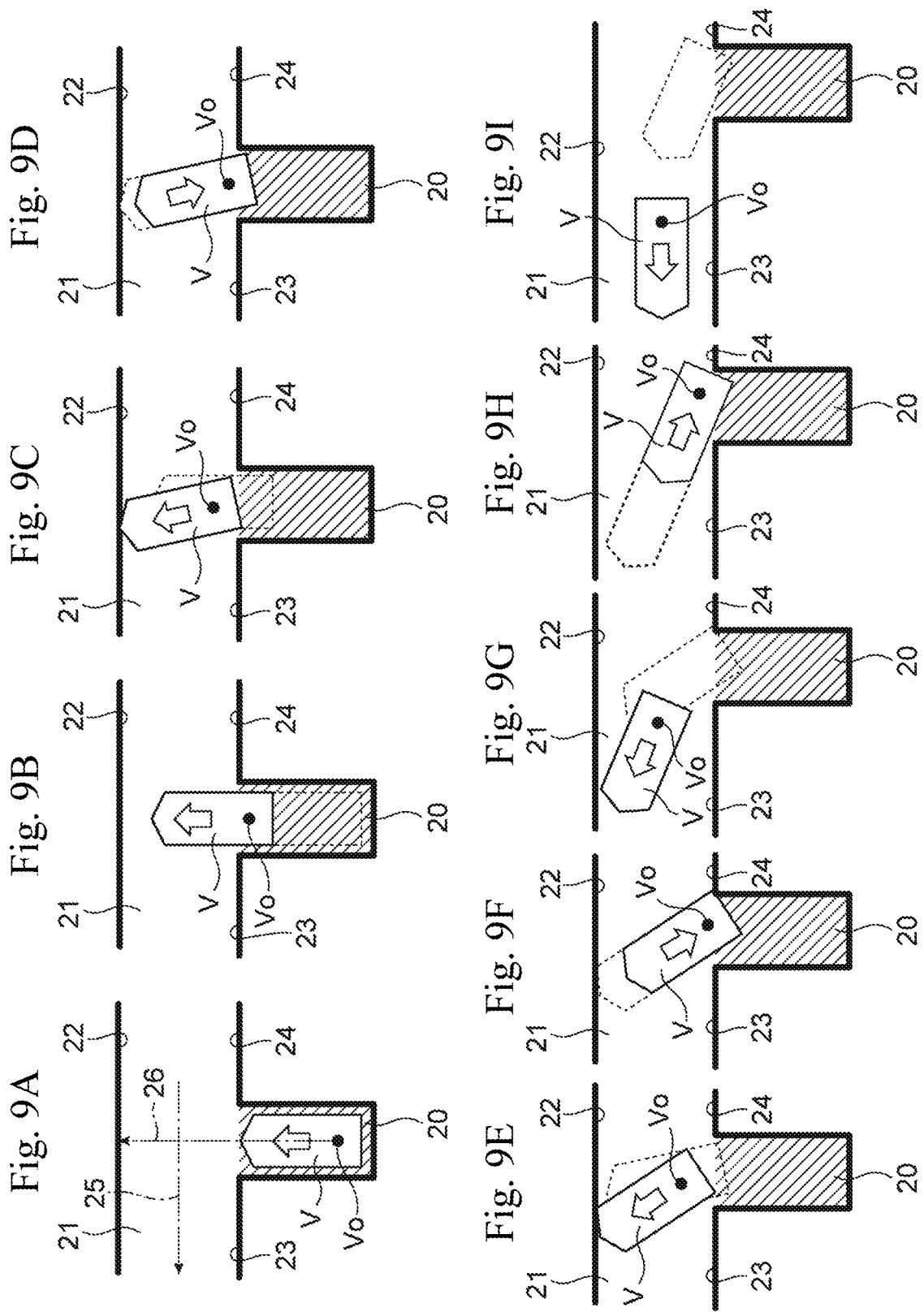

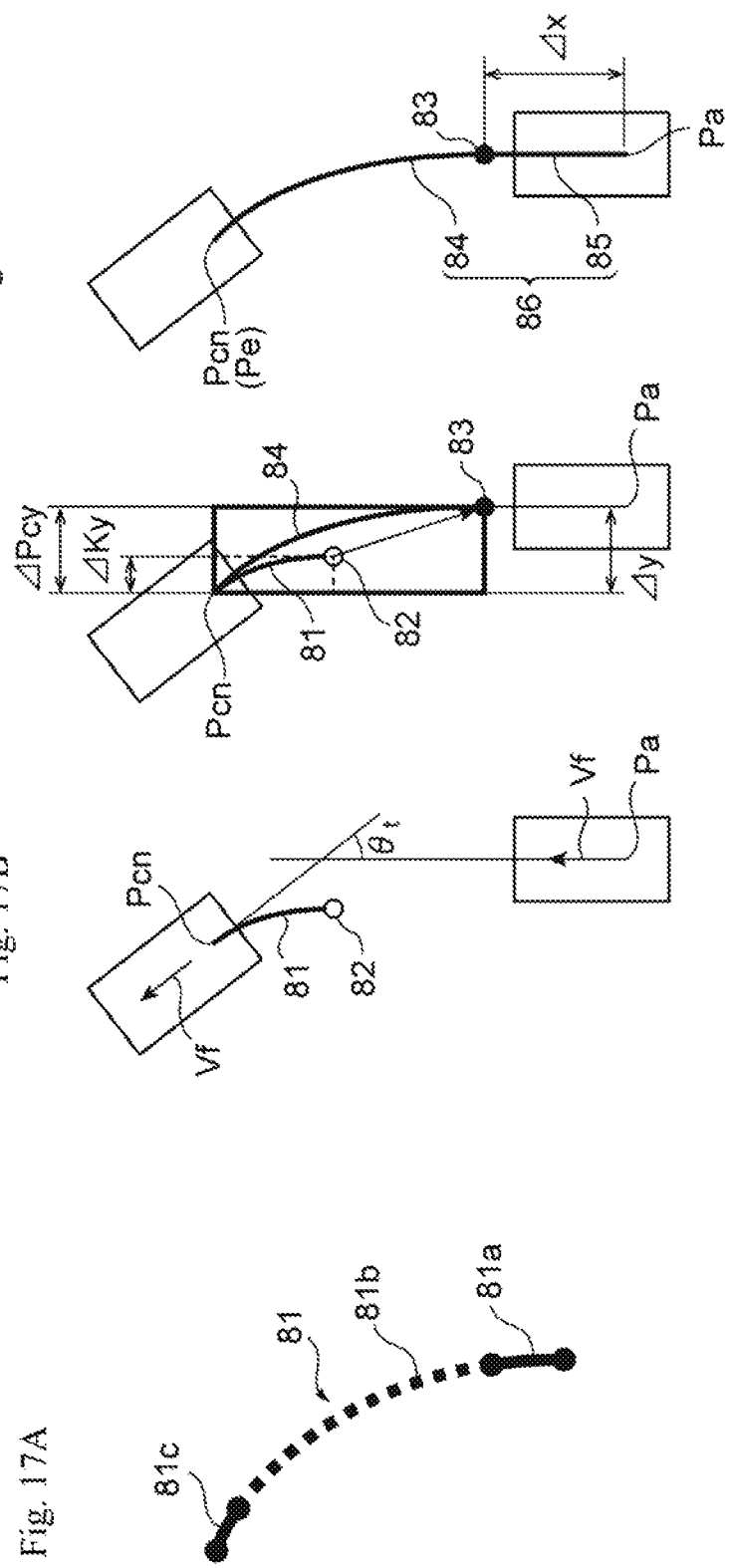

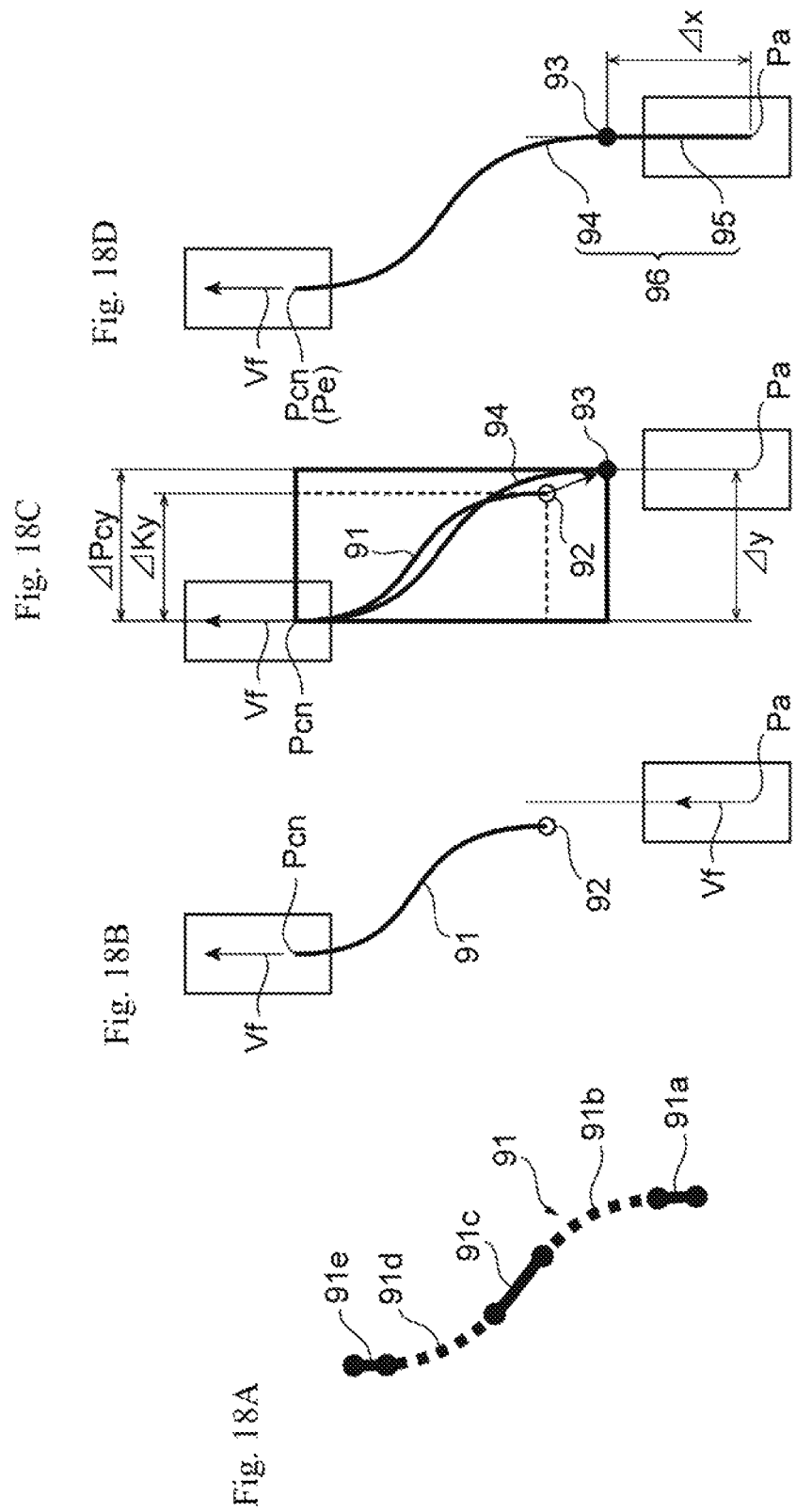

AUTONOMOUS DRIVING CONTROL DEVICE AND AUTONOMOUS DRIVING PATH COMPUTATION METHOD

CROSS REFERENCE TO RELATED APPLICATIONS

The present application claims priority from Japanese patent application JP 2018-196325 filed on Oct. 18, 2018, the content of which is hereby incorporated herein by reference into this application.

BACKGROUND

Technical Field

The present invention relates to an autonomous driving control device and an autonomous driving path computation method for vehicles.

Background Art

JP 2005-14775 A discloses a parking assistance system for automatically steering a vehicle. In this document, a technique is disclosed in which a driving path using a clothoid curve as a transition curve is computed so as to prevent a sudden change in the steering speed of the steering wheel.

SUMMARY

In this document, change from 0° to a preset steady-state angle are defined as being identical to that from the steady-state angle to 0°. However, a clothoid curve may coincide with a driving path, if a constant speed is set, and under such condition, operation of turning a steering wheel at a constant speed is performed.

Therefore, if the clothoid curve is applied to a system for turning the steering wheel while accelerating or decelerating the vehicle, such as a driving assistance system, a phenomenon that movement of a steering wheel changes suddenly fast or suddenly slow would occur, which may give a sense of discomfort to a driver.

The present invention has been made in view of the foregoing. Exemplary embodiments relate to providing an autonomous driving control device and an autonomous driving path computation method capable of computing a driving path that can reduce a sense of discomfort felt by a driver by varying the lengths of transition curves between an acceleration section and a deceleration section on the basis of a speed profile for driving a vehicle.

Accordingly, there is provided an autonomous driving control device for computing a driving path along which a vehicle is driven autonomously, including an acceleration section transition curve computing unit configured to compute an acceleration section transition curve on the basis of a target steering speed set in advance and an acceleration section target vehicle speed; and a deceleration section transition curve computing unit configured to compute a deceleration section transition curve on the basis of the target steering speed and a deceleration section target vehicle speed. A driving path is computed by setting the deceleration section target vehicle speed faster than the acceleration section target vehicle speed.

According to the present invention, a driving path that is suitable for given circumstances or user's needs can be computed. Further features related to the present invention will become apparent from the description of the specification and the accompanying drawings. In addition, other problems, configurations, and advantageous effects will become apparent from the following description of embodiments.

BRIEF DESCRIPTION OF THE DRAWINGS

FIG. 1 is a functional block diagram of a parking control device according to an embodiment of the present invention.

FIGS. 2A and 2B illustrate the state of reverse parking, specifically, the state of a vehicle before and after the parking.

FIGS. 3A, 3B and 3C illustrate exemplary types of connection paths.

FIGS. 4A, 4B, and 4C illustrate an exemplary parking path having transition curves and arc-shaped curves of the present embodiment.

FIG. 5 illustrates the relationship between changes in the travel distance and the vehicle speed regarding the parking path of FIG. 4.

FIG. 6 illustrates the relationship between the steering wheel angle and the distance based on the parking path of the present embodiment.

FIG. 7 illustrates the relationship between the steering wheel angle and the distance based on the conventional parking path.

FIGS. 9A, 9B, 9C, 9D, 9E, 9F, 9G, 9H, and 9I illustrate an exemplary method of computing a pull-out path for reverse parking.

FIGS. 17A, 17B, 17C, and 17D illustrate a method of generating a connection path using a transition curve that requires only a single-side steering maneuver.

FIGS. 18A, 18B, 18C, and 18D illustrate a method of generating a connection path using a transition curve that requires an S-turn steering maneuver.

DETAILED DESCRIPTION

Figure 8:
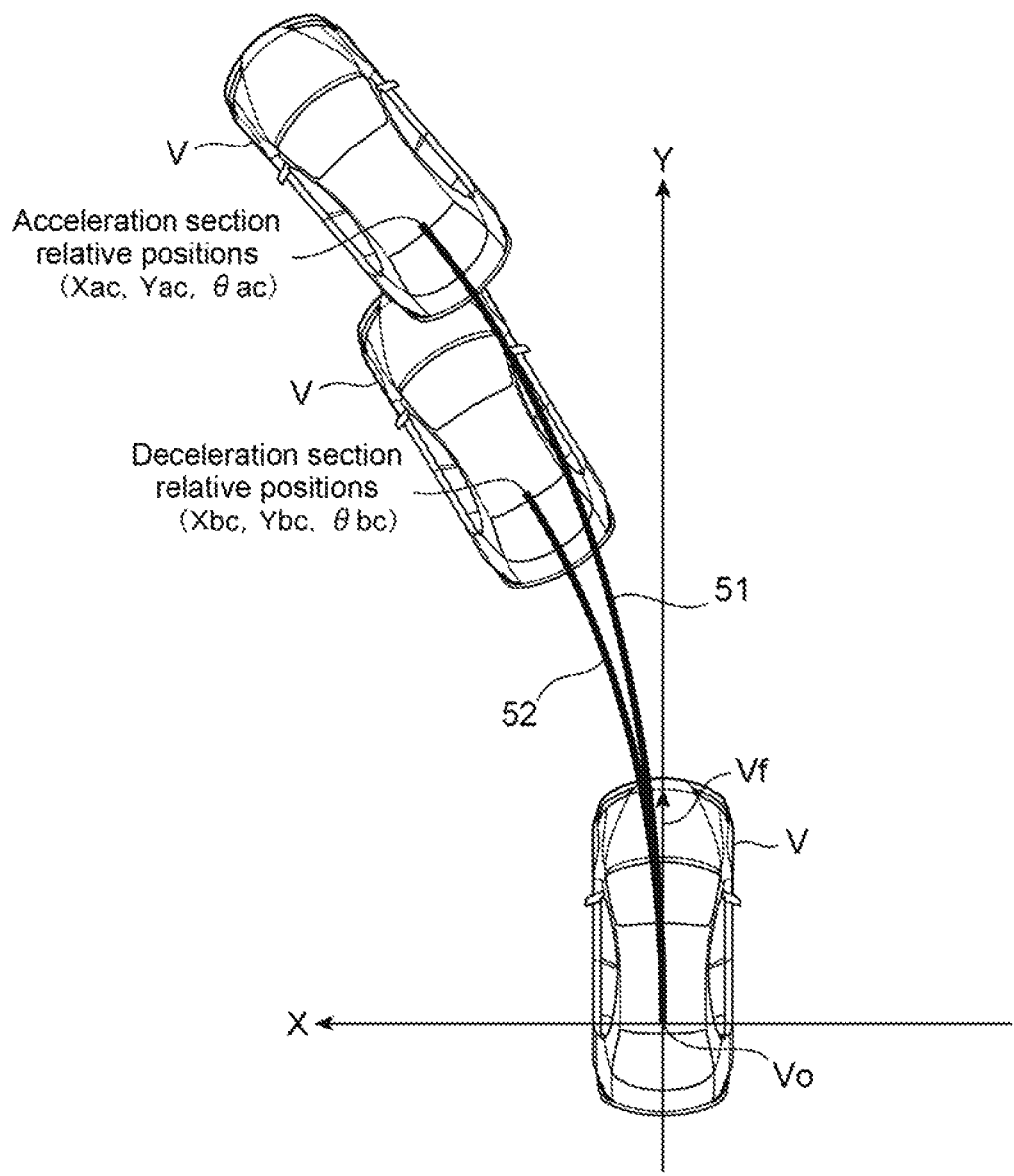
FIG. 8 illustrates the relative movement positions of the vehicle traveling along a transition curve.

Next, embodiments of the present invention will be described with reference to the drawings. The following embodiment illustrates a case where the autonomous driving control of the present invention is applied to automatic parking control in which a driving path is often considered as a curve. A parking control device of the present embodiment is encompassed by the autonomous driving control device of the present invention.

FIG. 1 is a functional block diagram of a parking control device according to an embodiment of the present invention. FIGS. 2A and 2B illustrate the state of reverse parking, specifically, the state of a vehicle before and after the parking.

A parking control device 1 computes a parking path for automatically parking a vehicle, and outputs the computation results to the vehicle control device 15. The vehicle control device 15 performs all of steering wheel operation, and accelerator operation and brake operation for the vehicle V, in place of a driver, on the basis of information on the parking path, and automatically parks the vehicle V at a target parking position by moving the vehicle V along the parking path. The parking control device 1 computes a parking path from the initial position of the vehicle V to the target parking position in the parking space.

For example, a parking space 20 illustrated in FIGS. 2A and 2B is provided on the left side with respect to a road orientation 25 of a road 21, and has a parking orientation 26 set therein so as to allow the vehicle V to be reverse parked in the parking space 20. The parking space 20 means a zoned area having a parking orientation set therein in advance so as to allow a vehicle to be parked in a predetermined orientation in the parking space 20. The parking space 20 is also referred to as a parking frame, parking slot, parking area, paring place, or parking lot, for example. In the parking space 20 illustrated in FIGS. 2A and 2B, the vehicle V is first turned to the right while being moved forward from the initial position P0, and is once stopped with its rear facing the parking space 20, and is then turned to the left while being going backward so that the vehicle V can enter the parking space 20.

The parking assistance device 1 computes a path for moving the vehicle V, so that the vehicle V is arranged with the vehicle orientation Vf directed in the same orientation as the parking orientation 26 at the target parking position P1 in the parking space 20 from the state in which the vehicle V is at the initial position P0 on the road 21 with the vehicle orientation Vf directed in the same orientation as the road orientation 25, and sets the computed path as a parking path. A parking path to be set herein basically includes a curve at least at a part thereof.

In the parking environment in which the vehicle V is parked, obstacles 23 and 24, such as other vehicles or other parking spaces, are arranged ahead of or behind the parking space 20 along the road 21. Also, an obstacle 22, such as a wall or a curb extending along the road orientation 25 of the road 21 or another vehicle, is arranged across the road 21 opposite to the parking space 20. It should be noted that in the present embodiment, the obstacles 23 and 24 are always present on the opposite sides of the parking space 20.

To generate a parking path, the parking control device 1 uses transition curves that are based on a target vehicle speed and the turning radius of the vehicle that moves autonomously. Accordingly, a parking path that is suitable for given circumstances or user's needs can be computed, and the vehicle V can be parked automatically.

Regarding movements of the vehicle V, all of steering wheel operations, accelerator operation and brake operation are basically performed by autonomous control. To park the vehicle V automatically, a target vehicle speed and acceleration can be set in advance, and transition curves can be set on the basis of them. Thus, a sense of discomfort felt by the driver can be reduced.

The parking control device 1 is installed on the vehicle V, and is implemented through cooperative operations of hardware, such as a microcomputer including a CPU and memory, and a software program. The parking control device 1 includes, as illustrated in FIG. 1, a transition curve computing unit 11, a candidate connection position setting unit 12, a connection path computing unit 13, and a parking path generating unit 14.

A parking path includes an acceleration section in which the vehicle V is accelerated from the stop state, a constant speed section that is continuous from the acceleration section and in which the vehicle V travels at a constant vehicle speed, and a deceleration section that is continuous from the constant vehicle speed and in which the vehicle V is decelerated to stop. In each of the acceleration section and the deceleration section, the vehicle is moved forward or backward while the steering angle of the steering wheel (i.e., steering wheel angle) is increased or decreased (i.e., while the steering wheel is turned). Therefore, transition curves are set. Meanwhile, in the constant speed section, the vehicle is moved forward or backward while the steering angle of the steering wheel is held constant. Therefore, an arc-shaped curve with a constant radius of curvature is set. In the present embodiment, the minimum turning radius of the vehicle V is set as the radius of curvature of the arc-shaped curve so that the length of the parking path becomes the shortest.

The transition curve computing unit 11 computes the length of each transition curve on the basis of a target steering speed and a target vehicle speed. At the same time as computing the length of each transition curve, the transition curve computing unit 11 also computes the relative movement positions of the vehicle traveling along the transition curve, on the basis of the target steering speed and the target vehicle speed. The transition curves computed by the transition curve computing unit 11 are used to compute a pull-out path and set candidate connection positions thereon in the candidate connection position setting unit 12, and also to compute a connection path in the connection path computing unit 13.

The transition curve computing unit 11 includes an acceleration section transition curve computing unit that computes an acceleration section transition curve on the basis of a target steering speed set in advance and an acceleration section target vehicle speed, and a deceleration section transition curve computing unit that computes a deceleration section transition curve on the basis of the target steering speed and a deceleration section target vehicle speed. The transition curve computing unit 11 sets the deceleration section target vehicle speed faster than the acceleration section target vehicle speed. Therefore, the length of the transition curve of the deceleration section becomes shorter than that of the acceleration section, and thus, a parking path with the shortest distance can be generated.

Conventionally, a transition curve for an acceleration section and that for a deceleration section have the same length. Therefore, a movement of the steering wheel becomes slow during deceleration of the vehicle, which may give a sense of discomfort to a driver. Further, conventionally, the deceleration section and the acceleration section have the same length. Therefore, the resulting parking path tends to be long.

In contrast, in the parking control device 1 of the present embodiment, regarding the settings of the acceleration section target vehicle speed and the deceleration section target vehicle speed for computing transition curves in the transition curve computing unit 11, the deceleration section target vehicle speed is set faster than the acceleration section target vehicle speed. Therefore, since the amount of change in the steering angle relative to the travel distance during acceleration of the vehicle has a gentle slope, it is possible to prevent the steering speed from becoming too fast. Meanwhile, since the amount of change in the steering angle relative to the travel distance during deceleration of the vehicle has a steep slope, it is possible to prevent the steering speed from becoming too slow and thus prevent the movement of the steering wheel from becoming too slow. Further, since the length of the deceleration section becomes shorter than that of the acceleration section, the length of the resulting parking path can be made shorter than that of the conventional device.

The candidate connection position setting unit 12 computes at least one pull-out path for pulling the vehicle V out of the target parking space 20 on the basis of information on the target parking space, constraint conditions regarding vehicle behavior, and transition curves and a predetermined arc-shaped curve computed with the transition curve computing unit 11, and then sets a plurality of candidate connection positions Pcn on the pull-out path.

The connection path computing unit 13 determines the type of a connection path that can connect the initial position P0 of the vehicle V to one of the candidate connection positions Pcn when the vehicle V start moving by moving forward. When a plurality of candidate connection positions has been set, the determination is performed for all of the candidate connection positions set.

FIG. 3 illustrates exemplary types of connection paths. It is determined whether the type of the connection path is a connection path that involves turning of the vehicle V to one of the right or left side (FIG. 3A); an S-shaped connection path that involves turning of the steering wheel to both the right and left sides, that is, turning the steering wheel in the direction toward the candidate connection position and then turning the steering wheel in the opposite direction (FIG. 3B); and an S-shaped connection path that involves turning of the steering wheel in the direction away from the candidate connection position and then turning the steering wheel in the opposite direction (FIG. 3C). It should be noted that when the connection path is a simple straight path, such a path is determined as an infinite S-shaped path.

The connection path computing unit 13 computes, on the basis of the determined type of the connection path, a connection path that allows the vehicle V to reach the candidate connection position from the initial position of the vehicle V when it starts moving forward from the initial position, using the transition curves and the arc-shaped curve computed with the transition curve computing unit 11. The method of computing the connection path will be described below.

The parking path generating unit 14 generates a parking path for the vehicle V by connecting the pull-out path and the connection path. The parking path is a path that allows the vehicle V to move along the connection path from the initial position P0 of the vehicle V to a park-out position Pe, and then inversely follow the pull-out path from the park-out position Pe to the target parking position P1.

The aforementioned transition curve computing unit 11, the candidate connection position setting unit 12, the connection path computing unit 13, and the parking path generating unit 14 constitute a parking path computing unit that computes a parking path using an acceleration section transition curve and a deceleration section transition curve.

The parking control device 1 receives, as illustrated in FIG. 1, target parking position information 181 and target parking space information 182. The target parking position information 181 includes information, such as the shape of the parking space 20 and the relative position of the parking space 20 with respect to the vehicle V. The target parking space information 182 includes information on constraint conditions regarding a parking space, such as the positions of and distances to obstacles around the parking space 20. The target parking position information 181 and the target parking space information 182 can be obtained from an external recognition sensor mounted on the vehicle V, such as a detected signal of an ultrasonic sensor mounted on the vehicle V or an image from an in-vehicle camera, for example. In addition, infrastructure information output from a parking facility may be obtained.

The vehicle information 183 includes information on constraint conditions regarding vehicle behavior, such as a turning radius of the vehicle V. For the vehicle position information 184, dead reckoning positions computed with a vehicle model on the basis of the steering angle and speed of the vehicle V as well as the number of revolutions of the wheels may be used, and also, positional information obtained with a sensor, such as a GPS, or vehicle position information obtained through road-vehicle communication or inter-vehicle communication may be used.

The vehicle control device 15 controls an actuator mounded on the vehicle V for vehicle operation, on the basis of output signals from the parking control device 1, so as to control the steering wheel operation, accelerator operation, and brake operation of the vehicle V, and automatically park the vehicle V at the target parking position P1 by moving it along the parking path.

The display unit 16 is an in-vehicle monitor that the driver can watch in the vehicle, and can display the positions for switching the direction of vehicle travel for a target parking path, while displaying an image from a camera in a overlapped manner. The display unit 16 may display not only the positions for switching the direction of vehicle travel but also the entire parking path. Then, the driver is able to visually check the positions for switching the direction of vehicle travel as well as a parking path displayed on the in-vehicle monitor.

Next, the configuration of each of the transition curve computing unit 11, the candidate connection position setting unit 12, and the connection path computing unit 13 will be described in detail.

<Transition Curve Computing Unit>

The transition curve computing unit 11 computes the length of each transition curve on the basis of the vehicle information 183, and also computes the relative movement positions of the vehicle V traveling along the transition curve.

FIGS. 4A, 4B, and 4C illustrate an exemplary parking path having transition curves and arc-shaped curves of the present embodiment. FIG. 4A illustrates an exemplary parking path for reverse parking, FIG. 4B illustrates a connection path of the parking path, and FIG. 4C illustrates a pull-out path of the parking path. FIG. 5 illustrates the relationship between changes in the travel distance and the vehicle speed regarding the parking path of FIG. 4. FIG. 6 illustrates the relationship between the steering wheel angle and the distance based on the parking path of the present embodiment. FIG. 7 illustrates the relationship between the steering wheel angle and the distance based on the conventional parking path.

The parking path illustrated in FIG. 4A includes a forward drive section 31 for moving the vehicle V forward from the initial position P0 to the park-out position Pe while turning it to the right, and a reverse drive section 41 for reversing the vehicle V from the park-out position Pe to the target parking position P1 while turning it to the left. The forward drive section 31 includes, as illustrated in FIG. 5, an acceleration section 311 for accelerating the vehicle speed to a predetermined speed from the initial position P0, a constant speed section 312 for moving the vehicle V at a predetermined speed over a constant distance, and a deceleration section 313 for decelerating the vehicle speed from the predetermined speed so as to stop the vehicle V at the park-out position Pe. In addition, the reverse drive section 41 includes an acceleration section 411 for accelerating the vehicle speed to a predetermined speed while reversing the vehicle V from the park-out position Pe, a constant speed section 412 for moving the vehicle V at a predetermined speed over a constant distance, and a deceleration section 413 for decelerating the vehicle speed from the predetermined speed so as to stop the vehicle V at the target parking position P1.

The acceleration section 311 of the forward drive section 31 includes a straight line 31d extending from the initial position P0 to a pass point 32, and an acceleration transition curve 31a continuous from the straight line 31d and extending to a pass point 33. The constant speed section 312 includes an arc-shaped curve 31b continuous from the acceleration section transition curve 31a and extending to a pass point 34. The deceleration section 313 includes a deceleration section transition curve 31c continuous from the arc-shaped curve 31b and extending to the park-out position Pe.

The acceleration section 411 of the reverse drive section 41 includes an acceleration section transition curve 41a extending from the park-out position Pe to a pass point 42. The constant speed section 412 includes an arc-shaped curve 41b continuous from the acceleration section transition curve 41a and extending to a pass point 43. The deceleration section 413 includes a deceleration section transition curve 41c continuous from the arc-shaped curve 41b and extending to a pass point 44, and a straight line 41d continuous from the deceleration section transition curve 41c and extending to the target parking position P1.

As described above, the acceleration section transition curve 31a is used for the acceleration section 311 of the forward drive section 31, the arc-shaped curve 31b is used for the constant speed section 312, and the deceleration section transition curve 31c is used for the deceleration section 313. In addition, the acceleration section transition curve 41a is used for the acceleration section 411 of the reverse drive section 41, the arc-shaped curve 41b is used for the constant speed section 412, and the deceleration section transition curve 41c is used for the deceleration section 413.

The acceleration section transition curve 31a is a curve whose curvature gradually increases from the pass point 32 between the straight line 31d and the acceleration section transition curve 31a toward the pass point 33 between the acceleration section transition curve 31a and the arc-shaped curve 31b. The deceleration section transition curve 31c is a curve whose curvature gradually decreases from the pass point 34 toward the park-out position Pe. The steering angle is 0° at the park-out position Pe. Meanwhile, the acceleration section transition curve 41a is a curve whose curvature gradually increases from the park-out position Pe toward the pass point 42. The deceleration section transition curve 41c is a curve whose curvature gradually decreases from the pass point 43 between the arc-shaped curve 41b and the deceleration section transition curve 41c to the pass point 44 between the deceleration section transition curve 41c and the straight line 41d.

The relationship between the steering wheel angle and the distance based on the conventional parking path illustrated in FIG. 7 includes a forward drive section 101 and a reverse drive section 111. The acceleration section of the forward drive section 101 includes a straight line 101d extending from the initial position P0 to a pass point 102, and an acceleration section transition curve 101a continuous from the straight line 101d. The constant speed section of the forward drive section 101 includes an arc-shaped curve 101b continuous from the acceleration section transition curve 101a. The deceleration section of the forward drive section 101 includes a deceleration section transition curve 101c continuous from the arc-shaped curve 101b and extending to the park-out position Pe. Meanwhile, the acceleration section of the reverse drive section 111 includes an acceleration section transition curve 111a extending from the park-out position Pe. The constant speed section of the reverse drive section 111 includes an arc-shaped curve 111b continuous from the acceleration section transition curve 111a. The deceleration section of the reverse drive section 111 includes a deceleration section transition curve 111c continuous from the arc-shaped curve 111b, and a straight line 111d continuous from the deceleration section transition curve 111c and extending to the target parking position P1. In the example illustrated in FIG. 7, the acceleration section transition curve 101a and the deceleration section transition curve 101c of the forward drive section 101 have the same length, and the acceleration section transition curve 111a and the deceleration section transition curve 111c of the reverse drive section 111 also have the same length.

In contrast, the relationship between the steering wheel angle and the distance based on the parking path of the present embodiment differs from the conventional one in that the acceleration section and the deceleration section have different lengths as illustrated in FIG. 6. Specifically, in the forward drive section 31, the length of the deceleration section transition curve 31c is shorter than that of the acceleration section transition curve 31a, and in the reverse drive section 41, the length of the deceleration section transition curve 41c is set shorter than that of the acceleration section transition curve 41a. The transition curve computing unit 11 computes an acceleration section transition curve and a deceleration section transition curve so that the length of the deceleration section transition curve becomes shorter than that of the acceleration section transition curve.

The distance S of each transition curve along which the vehicle V travels is computed with Formula (1) below. Computing the distance S by separately setting the vehicle travel speed V for each of the acceleration section and the deceleration section in Formula (1) below can vary the lengths of the transition curves between the acceleration section and the deceleration section. Meanwhile, the steering speed ω is set at the same speed for both the acceleration section and the deceleration section.

[Formula 1]

$$S = \frac{\delta}{\left(\frac{\omega}{V}\right)} \quad (1)$$

FIG. 8 illustrates the relative movement positions of the vehicle traveling along a transition curve. The relative positions Xc, Yc, θc of the vehicle that travels over the travel distance computed with the method of Formula (1) above are computed with Formulae (2), (3), and (4), respectively. The relative positions Xc, Yc, θc are computed for each of the acceleration section and the deceleration section, and are stored as acceleration section relative positions Xac, Yac, θac, and deceleration section relative positions Xbc, Ybc, θbc.

[Formula 2]

$$X_C = \int_0^S \cos\frac{\theta^2}{2} d\theta \quad (2)$$

[Formula 3]

$$Y_C = \int_0^S \sin\frac{\theta^2}{2} d\theta \quad (3)$$

[Formula 4]

$$\theta_C = \frac{\left(\frac{S}{R}\right)}{2} \quad (4)$$

In the present embodiment, the deceleration section target vehicle speed is set faster than the acceleration section target vehicle speed. Therefore, in the forward drive section 31, the length of the deceleration section transition curve 31c is shorter than that of the acceleration section transition curve 31a, and in the reverse drive section 41, the length of the deceleration section transition curve 41c is shorter than that of the acceleration section transition curve 41a.

<Candidate Connection Position Setting Unit>

The candidate connection position setting unit 12 computes a pull-out path on the basis of the target parking position information 181, the target parking space information 182, the vehicle information 183, and the acceleration section relative positions Xac, Yac, θac as well as the deceleration section relative positions Xbc, Ybc, θbc computed with the transition curve computing unit 11, and also computes candidate connection positions during computation of the pull-out path.

The pull-out path is a virtual movement path obtained by estimating a path along which the vehicle V is pulled out of the parking space 20 from the state in which the vehicle V is correctly arranged at the target parking position P1 in the parking space 20. The pull-out path is computed totally independently of and without relevance to the initial position P0 of the vehicle V. The candidate connection position setting unit 12 does not use the vehicle position information when computing the pull-out path. The number of pull-out paths is not limited to one, and more than one pull-out path may be computed.

The pull-out path is computed on the basis of information on the target parking space and the constraint conditions regarding vehicle behavior. For example, when reverse parking is conducted, provided that the target parking position P1 is the origin, a path is generated such that the vehicle V is pulled out of the parking space in the same direction as the orientation of the vehicle V at the initial position P0, is created.

For example, when conducting reverse parking in which the position or state of the vehicle V is reverse-parked at the target parking position P1, the following paths are computed: a path for moving the vehicle V straight forward from the target parking position P1 until the reference point Vo that is an intermediate position between the right and left rear wheels of the vehicle V (hereinafter referred to as a "position Vo" of the vehicle) reaches a position outside of the parking space 20; a forward drive path for moving the vehicle V forward while turning it in the direction to leave the parking space toward the same direction as the orientation of the vehicle V at the initial position P0 until the vehicle V reaches a reachable limit position with respect to an obstacle ahead; and a reverse drive path for reversing the vehicle V with its front wheels held straight with respect to the vehicle V or reversing the vehicle V while turning it in a direction opposite to the direction during the forward drive until the vehicle V reaches a reachable limit position with respect to an obstacle behind.

The forward drive path and the reverse drive path are alternately computed to compute a pull-out path until a predetermined termination condition is satisfied. It should be noted that the "reachable limit position" means a position at which the vehicle V is away from an obstacle with a predetermined gap therebetween. The predetermined gap includes a predetermined error taken into consideration as a margin so that the vehicle V will not contact the obstacle. The predetermined gap is preferably as small as possible, and is set to about 1 to 5 cm, for example. In the present embodiment, a virtual frame with a predetermined gap is set in a region around the outer periphery of the vehicle V, and a position at which the virtual frame contacts the obstacle is determined as a reachable limit position.

The candidate connection position setting unit 12 computes a pull-out path until at least one of the following conditions is satisfied as the predetermined termination condition, for example: a first condition in which the vehicle orientation Vf of the vehicle V on the pull-out path has an angle of 90° [deg] with respect to the parking orientation 26 and is in parallel with and in the same orientation as the road orientation 25, a second condition in which the vehicle V has reached a point that is away from the target parking position P1 by a predetermined distance Hmax along the road orientation 25, or a third condition in which the number of switching of the direction of vehicle travel on the pull-out path has reached a predetermined number.

FIGS. 9A-9I illustrate an exemplary method of computing a pull-out path for reverse parking. The pull-out path is computed as follows for the reverse parking exemplarily illustrated in FIGS. 9A-9I, for example: in FIG. 9A the vehicle V is moved straight forward from the state in which the vehicle V is parked in the parking space 20, in FIG. 9B the position Vo of the vehicle V reaches a position outside of the parking space 20, in FIG. 9C the vehicle V is moved forward from that position while being turned to the left until the vehicle V reaches a reachable limit position with respect to the obstacle 22 ahead, in FIG. 9D the vehicle V is reversed from that position with its front wheels adjusted straight again along the vehicle orientation of the vehicle V until the vehicle V reaches a reachable limit position with respect to the obstacle 24 behind, and then, the vehicle V is moved along in FIG. 9E a forward drive path for moving the vehicle V forward while turning it to the left, in FIG. 9F a reverse drive path for reversing the vehicle V straight, in FIG. 9G a forward drive path for moving the vehicle V forward while turning it to the left, and in FIG. 9H a reverse drive path for reversing the vehicle V straight so that in FIG. 9I the vehicle orientation Vf of the vehicle V has an angle of 90° [deg] with respect to the parking orientation 26 of the parking space 20 and is in parallel with and in the same orientation as the road orientation 25.

Herein, the deceleration section transition curve is introduced into the portion of the change in FIG. 9B to FIG. 9C, and the acceleration section transition curve is introduced into the portion immediately before FIG. 9C.

Figure 10B:
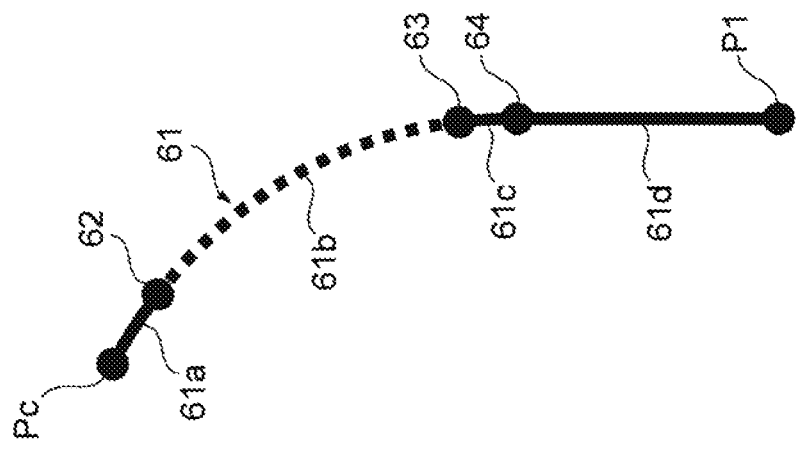
FIGS. 10A and 10B illustrate a case where transition curves are applied to a pull-out path.
Figure 10A:
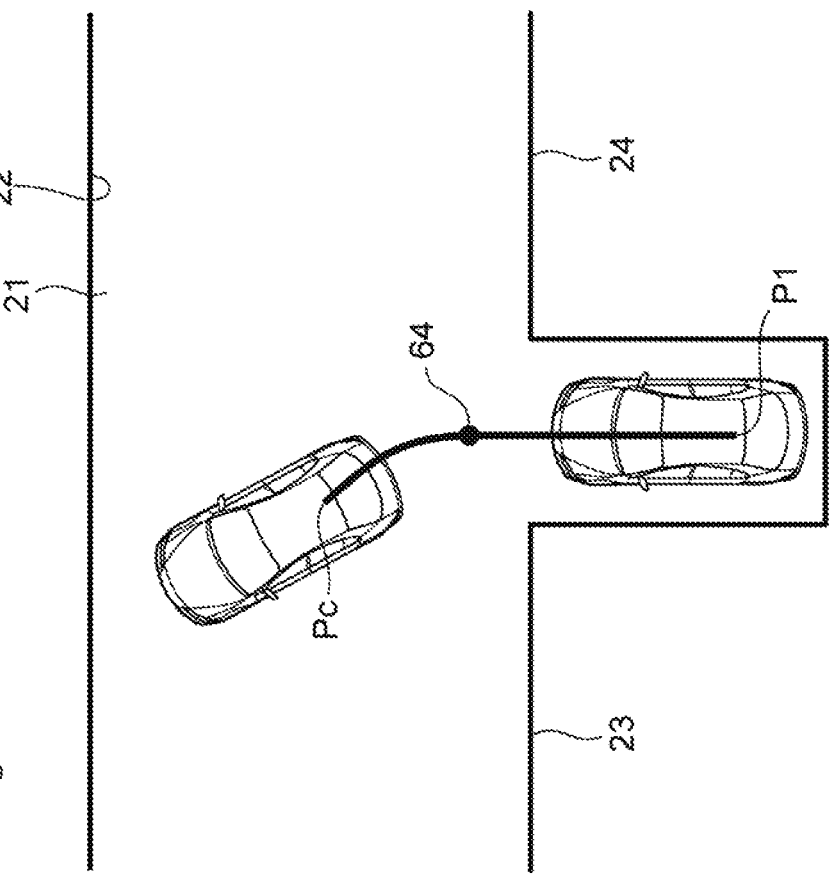

FIGS. 10A and 10B specifically illustrate the configuration of a path from FIG. 9A-FIG. 9C. The reason that the deceleration section transition curve is introduced into the portion of the change in FIG. 9B to FIG. 9C is that the degree of necessity to decelerate the vehicle V is high since the obstacles 23 and 24 are present around the parking space. In addition, the reason that the acceleration section transition curve is introduced into the portion immediately before in FIG. 9C is that as the computed pull-out path is finally set as an inverse path, the vehicle V actually moves in the direction away from the obstacle 22, and the operation of the vehicle at this time corresponds to the acceleration section after the direction of vehicle travel is switched.

It should be noted that the method of computing the pull-out path is not limited to the ones described above, and computation may be performed using other conditions. Further, computation may be performed using a condition suitable for a target parking space that has been selected from among a plurality of preset conditions. For example, although FIGS. 9A-9I illustrate an example in which the vehicle V reverses straight, the vehicle V may reverse while turning to a side opposite to the side to which the vehicle turns when moving forward. Alternatively, it is possible that the vehicle V moves straight forward when moving forward, and it turns only when it reverses. The acceleration section transition curve and the deceleration section transition curve are introduced only when the vehicle V turns and are not introduced when the vehicle V moves straight.

The candidate connection position setting unit 12 sets a plurality of candidate connection positions during computation of the pull-out path. A candidate connection position is a candidate position for determining whether the vehicle V can reach the candidate connection position by moving it forward from the initial position P0.

Figure 11:
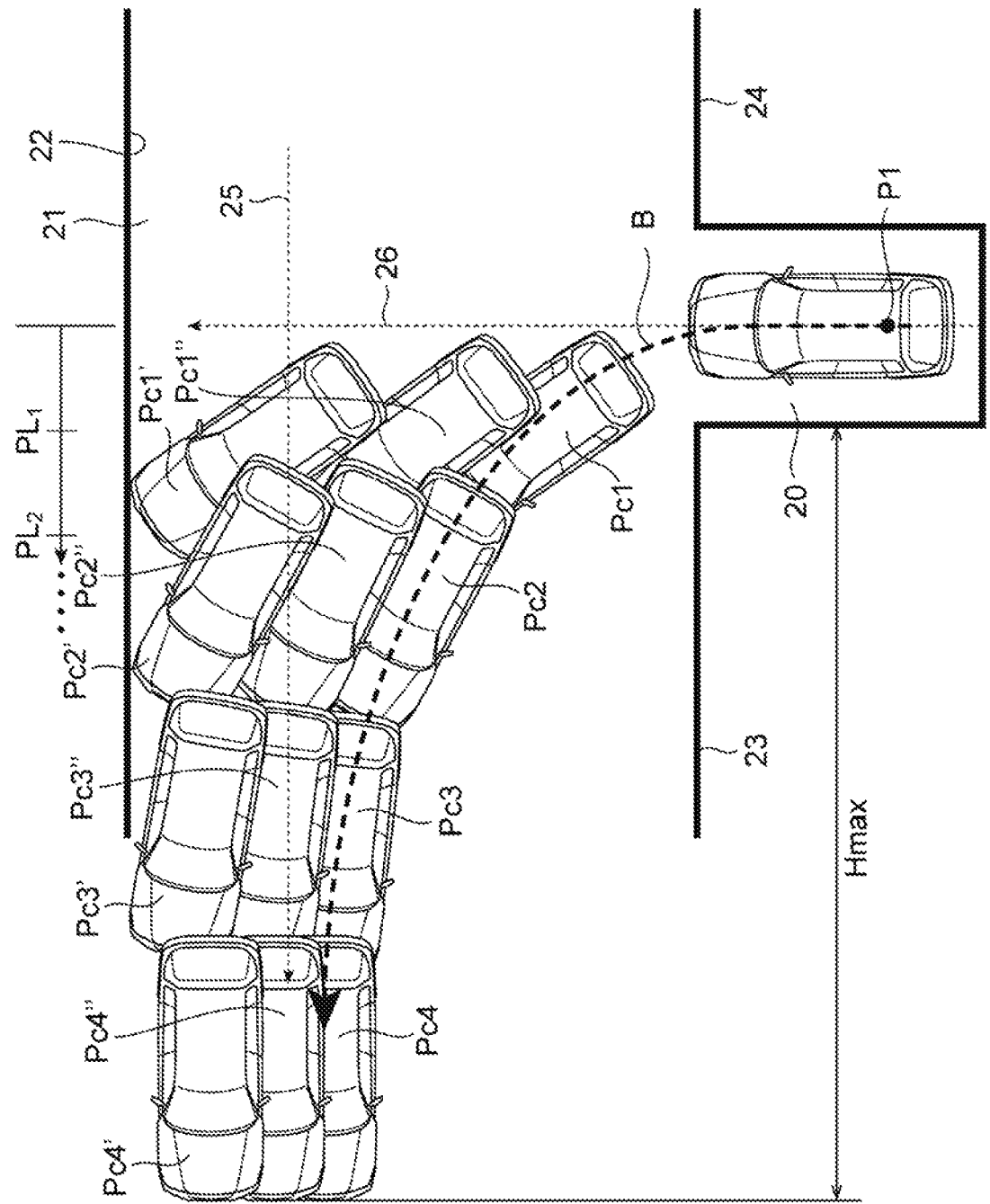
FIG. 11 illustrates an exemplary method of computing a pull-out path and candidate connection positions.

FIG. 11 illustrates candidate connection positions on the pull-out path for reverse parking. As one of the methods of setting candidate connection positions, for example, a plurality of candidate connection lines PLn (n is a number) is set at predetermined intervals on the road 21 along the road orientation 25 of the road 21. The positions of intersection between the position Vo of the vehicle V and the candidate connection lines PLn on the pull-out path are set as candidate connection positions Pcn (n is a number), and the candidate connection positions Pcn are stored in association with the vehicle orientations Vf of the vehicle V at those positions.

The candidate connection lines PLn are set at predetermined intervals on the road 21 along the road orientation of the road 21 in the leftward direction from the parking space 20 such that they extend in the width direction of the road 21 at positions ahead of the target parking position P1. In the present embodiment, the candidate connection lines PLn are set at intervals of 10° of, with reference to the vehicle orientation Vf at the target parking position P1, the relative angle with respect to the vehicle orientation Vf at the target parking position P1 or the switch position of the direction of vehicle travel.

Herein, the candidate connection positions Pcn are positions computed on the basis of a single pull-out path B. Considering the behavior of drivers, the operation of pulling the vehicle V to a position close to the obstacle 22 on the side of the road is often performed. Therefore, in the present embodiment, candidate connection positions Pcn' and Pcn" are also set at positions close to the obstacle 22 on the side of the road on the basis of the candidate connection positions Pcn set on the pull-out path B. In the drawing, symbol P1 denotes the target parking position, symbol B denotes an exemplary pull-out path for pulling the vehicle V out of the target parking position P1, symbol Pcn denotes an exemplary candidate connection position set on the pull-out path B, and symbols Pcn' and Pcn" denote exemplary candidate connection positions computed on the basis of symbol Pcn.

Figures 12A, 12B:
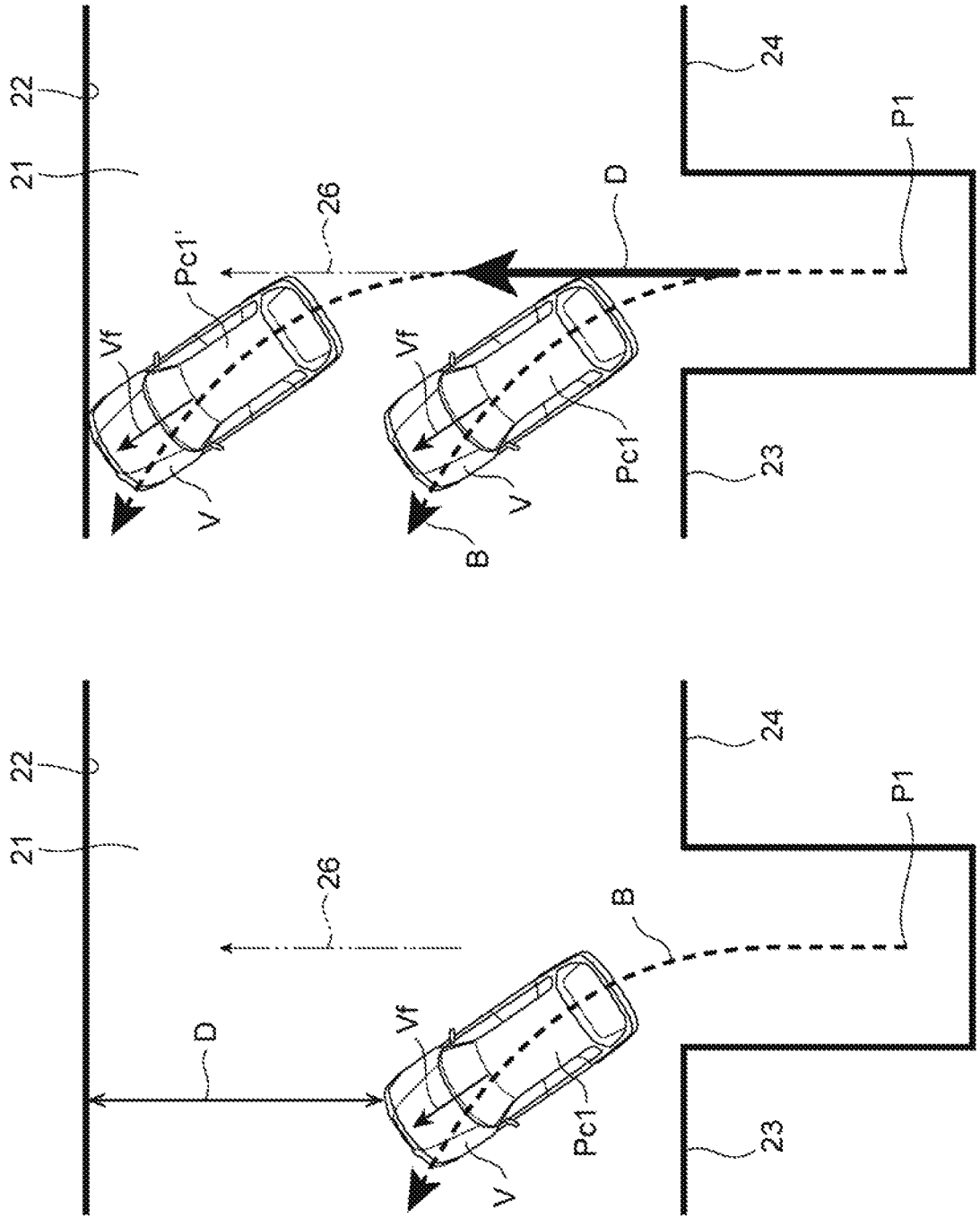
FIGS. 12A and 12B illustrate a method of expanding the candidate connection positions along the vehicle width direction.

FIGS. 12A and 12B illustrate a method of increasing the candidate connection positions. In the present embodiment, the distance D is added to the distance for moving the vehicle V straight from the target parking position P1, to increase the candidate connection positions Pcn' and Pcn" around the obstacle 22 on the side of the road. Specifically, as illustrated in FIG. 12A, the distance D from a corner of the vehicle at the candidate connection position Pc1 that is closest to the obstacle 22 on the side of the road is computed. Then, the computed distance D is added to the distance for moving the vehicle V straight from the target parking position P1 as illustrated in of FIG. 12B so as to set a new candidate connection position Pc1' around the obstacle 22 on the side of the road. At this time, the vehicle orientation Vf of the vehicle V at the candidate connection position Pc1' is inclined with respect to the parking orientation 26 at the same angle as the vehicle orientation Vf of the vehicle V at the candidate connection position Pc1 on the pull-out path B as a reference.

In addition, a distance D/2 that is a half the computed distance D is added to the distance for moving the vehicle V straight from the target parking position P1 so as to set a new candidate connection position Pc1" around the obstacle 22 on the side of the road as illustrated in FIG. 11. Similarly, regarding the candidate connection positions Pc2, Pc3, and Pc4, candidate connection positions Pc2', Pc2", Pc3', Pc3", Pc4', and Pc4" are also set using the distances D and D/2.

In the present embodiment, as illustrated in FIG. 12A, a method of r computing the candidate connection position Pc1' by adding the maximum straight movement amount of the distance D from the corner of the vehicle at the candidate connection position Pc1 that is closest to the road to the obstacle 22 on the side of the road, and a method of computing the candidate connection position Pc1" by adding a half the distance D/2 are adopted. However, the straight movement distance to be added may be any value as long as it is less than or equal to the maximum distance to the obstacle on the side of the road. Further, the number of dividing the distance D may be any number.

Figure 13:
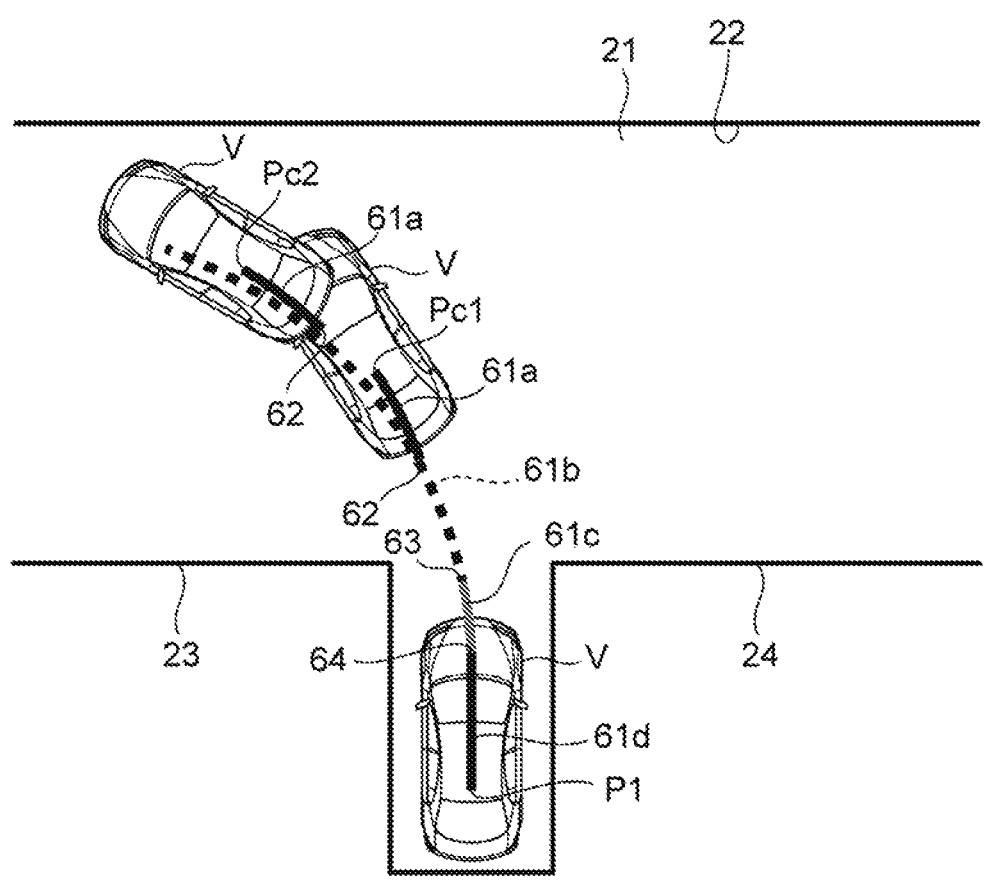
FIG. 13 illustrates candidate connection positions on a pull-out path for reverse parking.

FIG. 13 illustrates a method of determining candidate connection positions taking an acceleration section transition curve into consideration.

As illustrated in FIG. 13, the candidate connection positions Pcn to be set at predetermined intervals on the road 21 are each set as having an acceleration section transition curve. That is, in the present embodiment, when positions obtained by adding the acceleration section relative positions Xac, Yac, θac to the movement positions (which include the angle) on an arc are at predetermined intervals (i.e., at intervals of 10° of the relative angle with respect to the vehicle orientation Vf at the target parking position), such positions are set and stored as the candidate connection positions Pcn.

The candidate connection position setting unit 12 computes a pull-out path taking into consideration a deceleration section transition curve 61c and an acceleration section transition curve 61a, and sets the candidate connection positions Pcn on the pull-out path. Specifically, the candidate connection position setting unit 12 computes a pull-out path for pulling the vehicle V from the target parking position P1 using the deceleration section transition curve 61*c* and an arc-shaped curve 61*b* computed with the transition curve computing unit 11. Then, at least one candidate connection position Pcn is set on the pull-out path using the acceleration section transition curve transition curve 61*a* computed with the transition curve computing unit 11.

The candidate connection position setting unit 12 connects the deceleration section transition curve 61*c* to a straight-line section 61*d* extending from the target parking position P1 in a continuous manner, and connects the arc-shaped curve 61*b* to the deceleration section transition curve 61*c* in a continuous manner. Then, the candidate connection position setting unit 12 sets the candidate connection positions Pcn taking into consideration the acceleration section transition curve 61*a*.

In the present embodiment, the length of the deceleration section transition curve 61*c* and the relative positions of the vehicle V on the deceleration section transition curve 61*c* are computed in advance on the basis of a target steering speed and a deceleration section target vehicle speed, and the length of the acceleration section transition curve 61*a* and the relative positions of the vehicle V on the acceleration section transition curve 61*a* are computed in advance on the basis of the target steering speed and an acceleration section target vehicle speed (see FIG. 8). In addition, the arc-shaped curve 61*b* is set so that it has a constant radius of curvature (i.e., the minimum turning radius in the present embodiment). The candidate connection positions Pcn are set at intervals of 10° of, with reference to the vehicle orientation Vf at the target parking position P1, the relative angle of the vehicle orientation Vf with respect to the vehicle orientation Vf at the target parking position P1 or the switch position of the direction of vehicle travel.

Therefore, connecting the deceleration section transition curve 61*c* to the tip end position 64 of the straight-line section 61*d* in a continuous manner can determine the position of the tip end 63 of the deceleration section transition curve 61. In addition, the arc-shaped curve 61*b* is connected to the tip end 63 of the deceleration section transition curve 61 in a continuous manner, and the acceleration section transition curve 61*a* is connected to the arc-shaped curve 61*b* in a continuous manner. The acceleration section transition curve 61*a* is, with the length of the arc-shaped curve 61*b* varied, arranged at intervals of 10° of the relative angle between the orientation of the tangent at the tip end of the acceleration section transition curve 61*a* and the vehicle orientation Vf at the target parking position P1. Then, the tip ends of the acceleration section transition curve 61*a* are set as the candidate connection positions Pc1, Pc2, . . . , Pcn.

Figure 14:
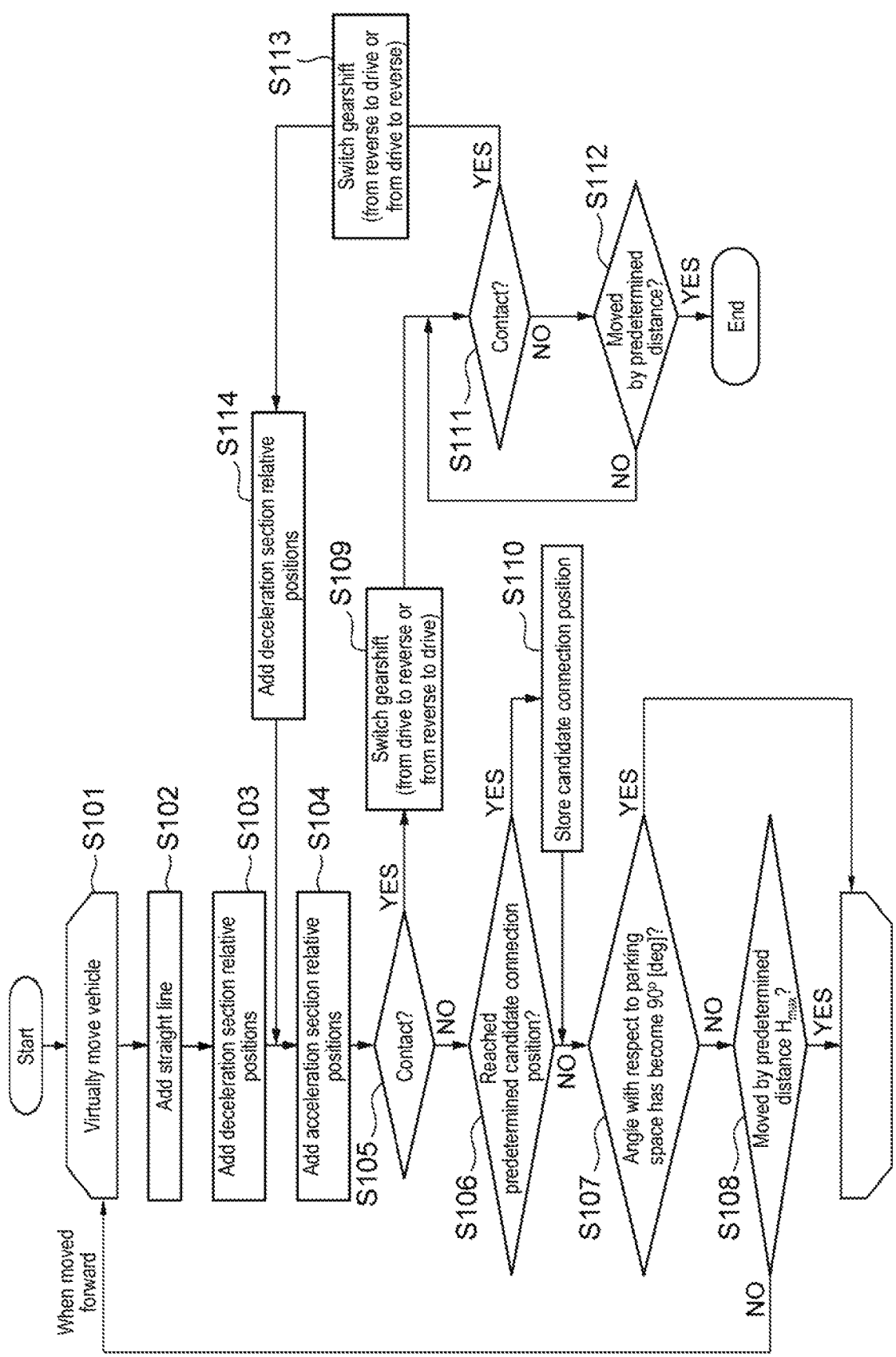
FIG. 14 is a flowchart illustrating a method of computing candidate connection positions on a pull-out path.

FIG. 14 is a flowchart illustrating an exemplary method of computing candidate connection positions on the pull-out path. First, computation for virtually moving the vehicle V in the direction to leave the target parking position P1 is performed according to a predetermined rule (S101). Herein, straight-line section relative positions for moving the vehicle V straight from the target parking position P1 are added to the virtual frame of the vehicle V (S102), and the deceleration section relative positions Xbc, Ybc, θbc are added to the straight-line section relative positions in a continuous manner (S103). Then, arc-section relative positions having a constant radius of curvature are added to the deceleration section relative positions in a continuous manner, and the acceleration section relative positions Xac, Yac, and θac are added to the arc-section relative positions in a continuous manner (S104). Then, whether the virtual frame of the vehicle V contacts an obstacle is determined (S105).

If it is determined that virtual frame of the vehicle V does not contact an obstacle (NO in S105), whether the vehicle V has reached a predetermined candidate connection position Pcn is determined (S106). Then, when the position Vo of the vehicle V has passed a candidate connection line PLn, such position is set as the candidate connection position Pcn, and the vehicle orientation Vf of the vehicle V at that position is stored (S110).

Then, whether the vehicle V is at an angle of 90° [deg] with respect to the parking orientation 26 and the vehicle orientation Vf is in parallel with the road orientation 25 (i.e., whether the first condition is satisfied) is determined (S107), and if it is determined that the vehicle V is at an angle of 90° [deg] with respect to the parking orientation 26 and the vehicle orientation Vf is in parallel with and in the same orientation as the road orientation 25 (YES in S107), the first condition is determined to be satisfied, and thus, the present routine terminates.

Meanwhile, if the vehicle orientation Vf of the vehicle V is not determined to be at an angle of 90° [deg] with respect to the parking orientation 26, whether the vehicle V has moved away from the parking space by a distance greater than or equal to a predetermined distance Hmax is determined (S108). In the present embodiment, the predetermined distance Hmax is set to 7 meters. If the vehicle V is determined to have moved by a distance greater than or equal to the predetermined distance Hmax, the second condition is determined to be satisfied, and thus, the present routine terminates.

As another method of setting candidate connection positions, the candidate connection position setting unit 12 may, each time the vehicle orientation Vf of the vehicle V has changed by a predetermined relative angle (for example, every 5° [deg]) when the vehicle V is moved in the direction to leave the parking space along the pull-out path, set such position as a candidate connection position. Accordingly, the position Vo of the vehicle V when the orientation Vf of the vehicle V is at an angle of 5°, 10°, 15°, . . . , 90° with respect to the parking orientation 26 is each set as the candidate connection position Pcn.

If it is determined that the virtual frame of the vehicle V contacts an obstacle (YES in S105), such position is determined as a reachable limit position, and the gearshift of the vehicle V is switched from the D (drive) range to the R (reverse) range or from the R range to the D range so that the direction of travel of the vehicle V is switched back from forward drive to reverse drive or from reverse drive to forward drive (S109). Then, whether the virtual frame of the vehicle V contacts an obstacle is determined (S111).

If it is determined that the virtual frame of the vehicle V does not contact an obstacle (NO in S111), whether the vehicle V has moved by a predetermined distance is determined (S112). If it is determined that the vehicle V has not moved by the predetermined distance (NO in S112), the process returns to step S111, and whether the virtual frame of the vehicle V contacts an obstacle is determined. If it is determined that the vehicle V has moved by the predetermined distance (YES in S112), the process is determined to have failed and thus is terminated.

Meanwhile, if it is determined that the virtual frame of the vehicle V contacts an obstacle (YES in S111), such position is determined as a reachable limit position, and the gearshift of the vehicle V is switched from the D (drive) range to the R (reverse) range or from the R range to the D range so that the direction of travel of the vehicle V is switched back from forward drive to reverse drive or from reverse drive to forward drive (S113). Then, the deceleration section relative positions are added to the reachable limit position and the process returns to the loop again (S114).

<Connection Path Computing Unit>

The connection path computing unit 13 computes a connection path that allows the vehicle V to reach at least one of the plurality of candidate connection positions Pcn from the initial position P0 of the vehicle V.

Whether the vehicle V can reach the candidate connection position Pcn is determined on the basis of the position Vo and vehicle orientation Vf of the vehicle V. If the position Vo of the vehicle V coincides with the candidate connection position Pcn and the vehicle orientation Vf of the vehicle V coincides with the vehicle orientation Vf stored in association with the candidate connection position Pcn through computation by the candidate connection position setting unit 12, it is determined that the vehicle V can reach the candidate connection position Pcn.

If the vehicle V can be moved from the initial position P0 and arranged in a predetermined vehicle orientation Vf at one of the candidate connection positions Pcn, then, the vehicle V can be moved into the parking space 20 by inversely following the pull-out path. Thus, the connection path computing unit 13 sets, among the plurality of candidate connection positions Pcn on the pull-out path, a candidate connection position Pcn at which the vehicle V can be arranged in a predetermined vehicle orientation Vf from the initial position P0, as a park-out position Pe, and computes a connection path from the initial position P0 to the park-out position Pe.

Figure 15:
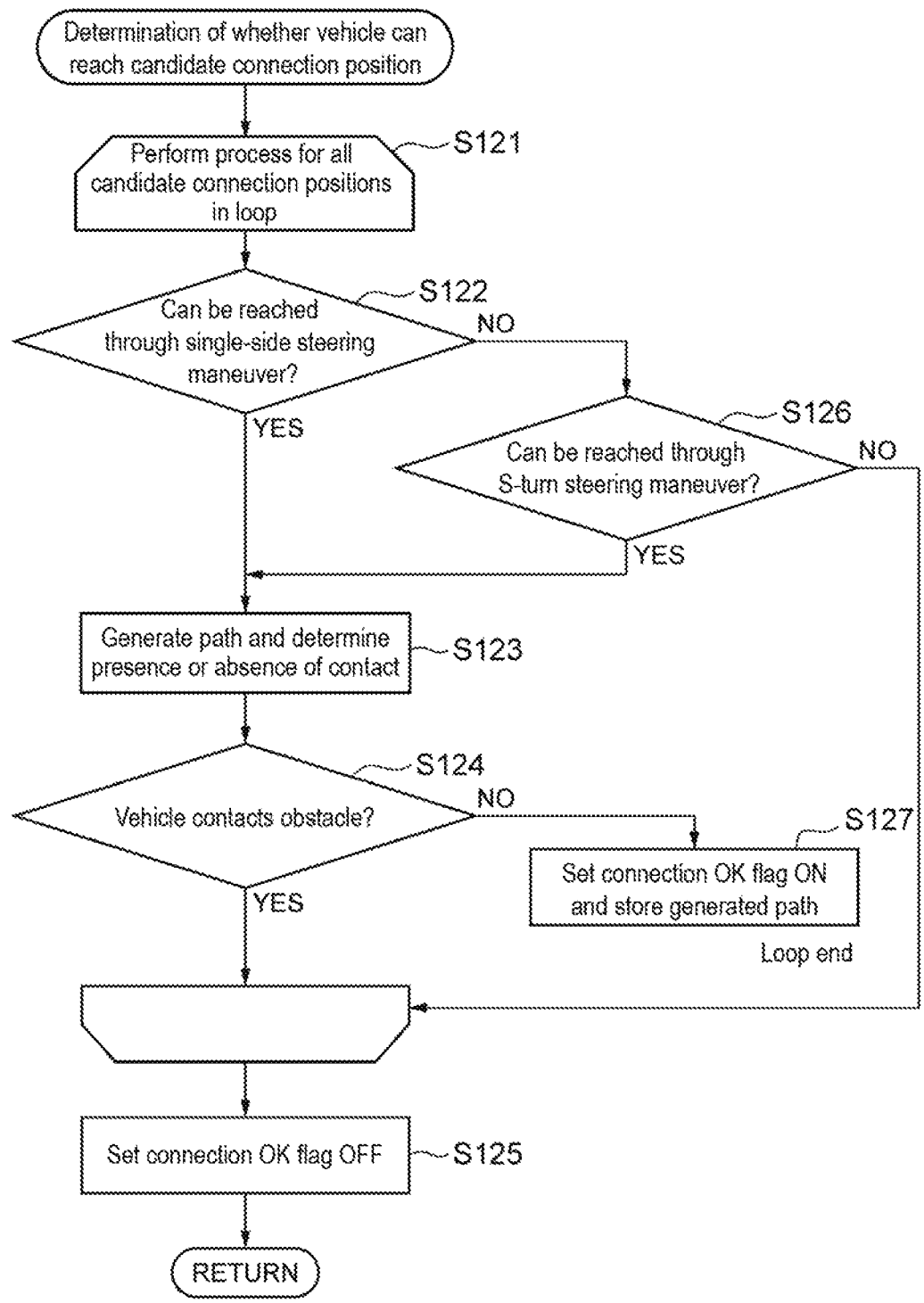
FIG. 15 is a process flow for determining whether a vehicle can reach a candidate connection position.

FIG. 15 is a process flow for determining whether the vehicle V can reach the candidate connection position Pcn. This process flow is performed for the total number of the candidate connection positions Pcn in a loop (S121). First, whether the vehicle V can reach the nearest candidate connection position Pcn from the initial position P0 through a single-side steering maneuver is determined (S122). The "single-side steering maneuver" as referred to herein is an operation of turning the steering of the vehicle V to only one of the right or left side of the vehicle V. With this operation, the steering wheel is turned to one of the right or left side with respect to the vehicle orientation Vf. If it is determined that the vehicle V cannot reach the candidate connection position Pcn through a single-side steering maneuver alone, then, whether the vehicle V can reach the candidate connection position Pcn through an S-turn steering maneuver is determined (S126). The "S-turn steering maneuver" as referred to herein is an operation of turning the steering of the vehicle V to both the right and left sides of the vehicle V. With this operation, the steering wheel is turned to both the right and left sides with respect to the vehicle orientation Vf.

If it is determined that the vehicle V can reach the candidate connection position Pcn through a single-side steering maneuver or an S-turn steering maneuver, such candidate connection position Pcn is selected as a park-out position Pe, and a connection path from the initial position P0 of the vehicle V to the park-out position Pe is generated (S123).

Then, whether the virtual frame of the vehicle V contacts an obstacle on the connection path is determined (S124). If it is determined that the virtual frame of the vehicle V does not contact the obstacle, the connection OK flag is set ON and the generated connection path is stored in a storage, and thus, the loop terminates (S127). Meanwhile, if it is determined that the vehicle V cannot reach the candidate connection position Pcn through a single-side steering maneuver or an S-turn steering maneuver (NO in S122 and S126), or if it is determined that the virtual frame of the vehicle V contacts the obstacle (YES in S124), the determination for the relevant candidate connection position Pcn terminates, and determination for the other remaining candidate connection positions Pcn is performed. Then, if it is determined that the vehicle V cannot reach any of the candidate connection positions Pcn, the connection OK flag is set OFF (S125), and the process flow terminates.

Figure 16A:
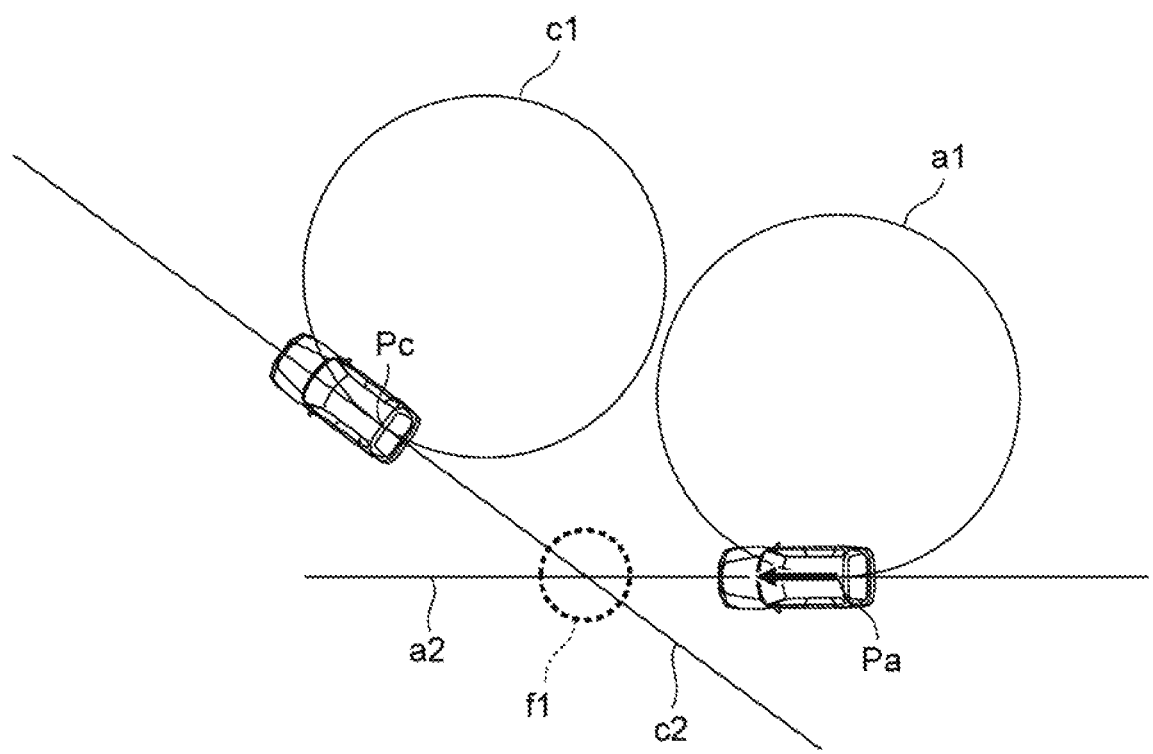
FIG. 16A illustrates an example of determination of whether the vehicle can reach the candidate connection position through a single-side steering maneuver.
Figure 16B:
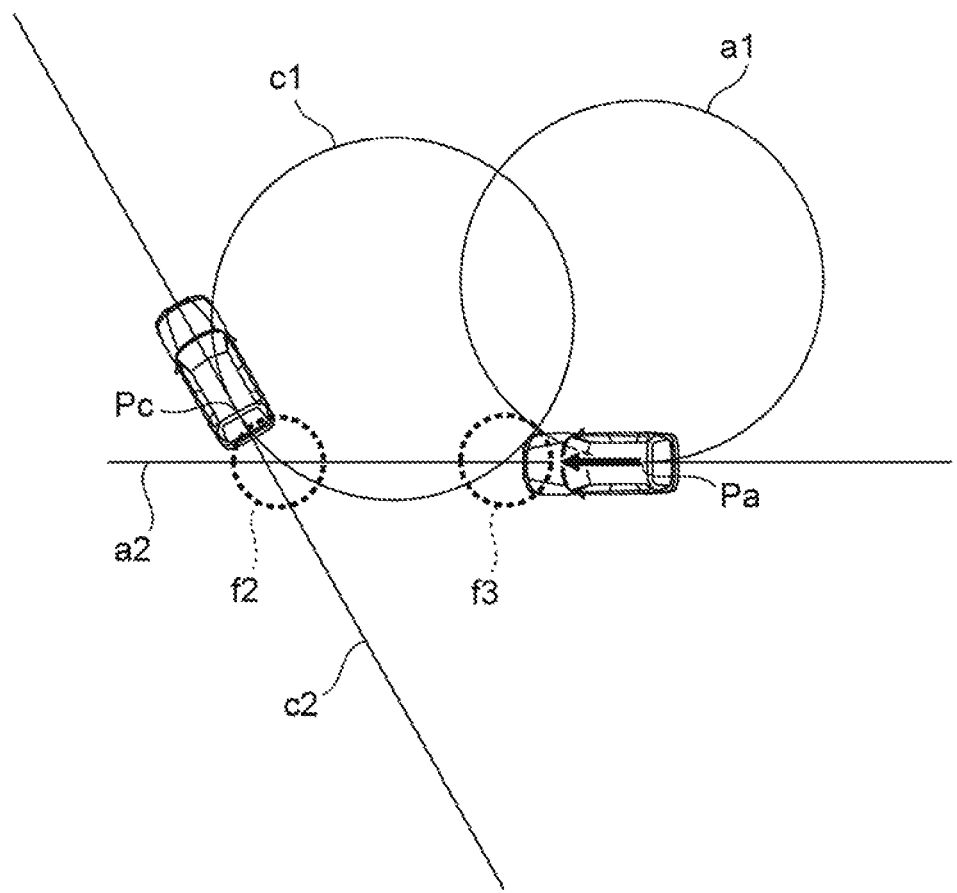
FIG. 16B illustrates an example of determination of whether the vehicle can reach the candidate connection position through a single-side steering maneuver.
Figure 16C:
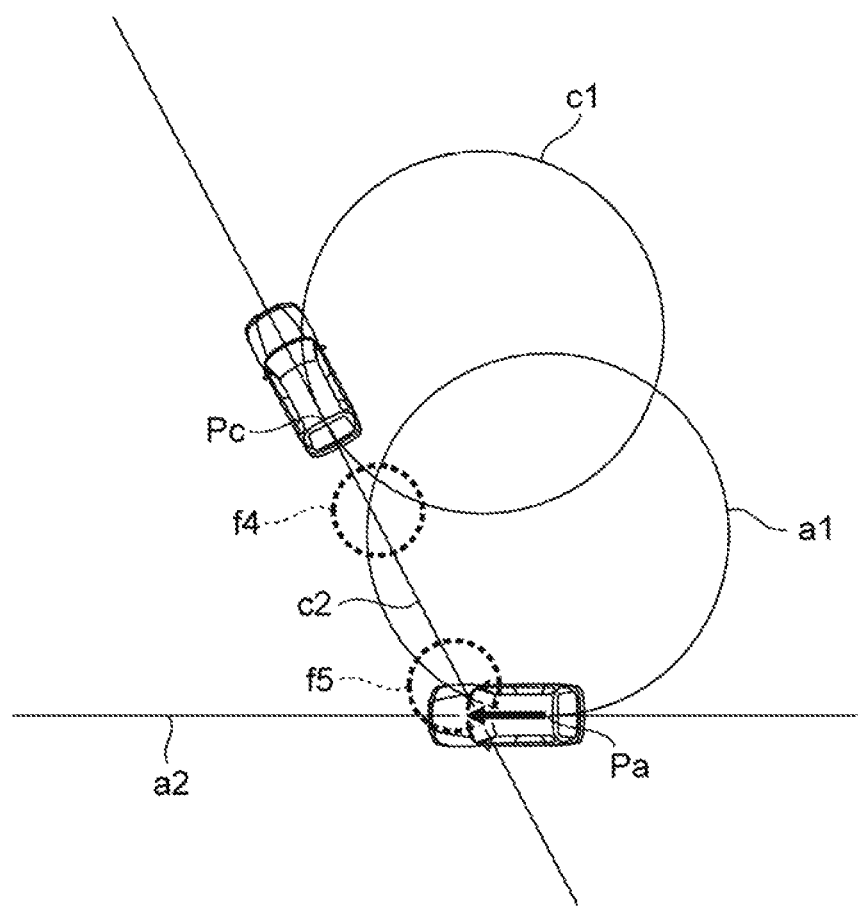
FIG. 16C illustrates an example of determination of whether the vehicle can reach the candidate connection position through a single-side steering maneuver.
Figure 16D:
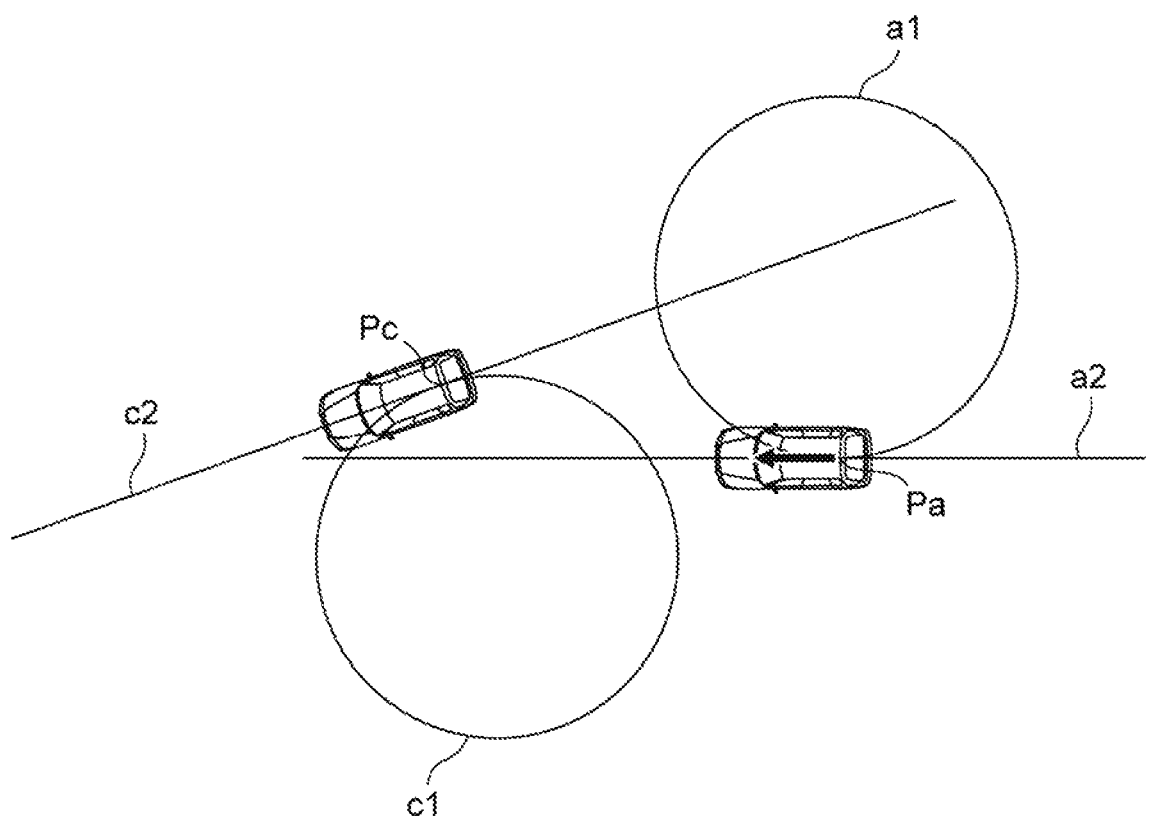
FIG. 16D illustrates an example of determination of whether the vehicle can reach the candidate connection position through an S-turn steering maneuver.
Figure 16E:
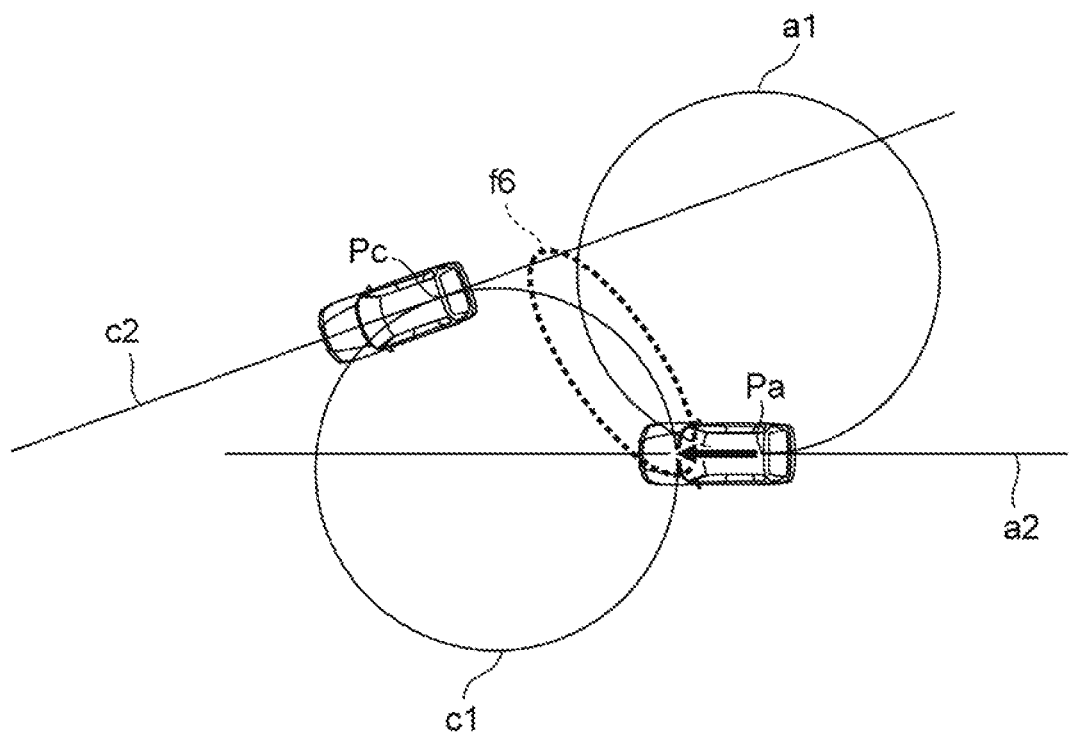
FIG. 16E illustrates an example of determination of whether the vehicle can reach the candidate connection position through an S-turn steering maneuver.

FIGS. 16A to 16C each illustrate an example of determination of whether the vehicle V can reach a candidate connection position through a single-side steering maneuver. FIGS. 16D and 16E each illustrate an example of determination of whether the vehicle V can reach a candidate connection position through an S-turn steering maneuver.

In the determination of whether the vehicle V can reach a candidate connection position through a single-side steering maneuver in S122, it is determined that the vehicle V can reach the candidate connection position if all of the following conditions (1) to (3) are satisfied (i.e., restrictions regarding the angular difference and positions are also imposed).

(1) An axis a2 (vehicle orientation Vf) of the vehicle V at the current position Pa (i.e., initial position P0) intersects an axis c2 (vehicle orientation Vf) of the vehicle V at a candidate connection position Pcn.

(2) A turning circle a1 at the current position Pa does not intersect the axis c2 at the candidate connection position Pcn.

(3) A turning circle c1 at the candidate connection position Pcn does not intersect the axis a2 at the current position Pa.

It should be noted that a "turning circle" herein means an arc on the turning side with the clothoid curve taken into consideration (i.e., minimum turning trajectory).

In the example illustrated in FIG. 16A, the aforementioned condition (1) is satisfied since the axes a2 and c2 intersect at a position of intersection f1. In addition, the aforementioned conditions (2) and (3) are also satisfied. Therefore, it is determined that the vehicle V can reach the candidate connection position through a single-side steering maneuver. Meanwhile, in FIG. 16B, the aforementioned condition (3) is not satisfied since the turning circle c1 intersects the axis a2. In addition, in the example illustrated in FIG. 16C, the aforementioned condition (2) is not satisfied since the turning circle a1 intersects the axis e2. Therefore, in the example illustrated in FIGS. 16B and 16C, it is determined that the vehicle V cannot reach the candidate connection position through a single-side steering maneuver, and the process proceeds to determination of whether an S-turn steering maneuver is available.

In the determination of whether the vehicle V can reach the candidate connection position through an S-turn steering maneuver in S126, it is determined that the vehicle V can reach the candidate connection position if the following condition (4) is satisfied (i.e., restrictions regarding the angular difference and positions are also imposed).

(4) The turning circle a1 at the current position Pa and the turning circle c1 at the candidate connection position Pcn do not intersect.

In the example illustrated in FIG. 16D, the aforementioned condition (4) is satisfied since the turning circle a1 and the turning circle c1 do not intersect. Therefore, it is determined that the vehicle V can reach the candidate connection position through an S-turn steering maneuver. Meanwhile, in the example illustrated in FIG. 16E, the aforementioned condition (4) is not satisfied since the turning circle a1 and the turning circle c1 intersect. Therefore, it is determined that the vehicle V cannot reach the candidate connection position through an S-turn steering maneuver.

FIGS. 17A, 17B, 17C, and 17D illustrate a method of generating a connection path using a transition curve that requires only a single-side steering maneuver. To generate a path from the current position Pa of the vehicle V to the candidate connection position Pcn, first, a reference single-side steering maneuver curve 81, which is obtained by adding together an acceleration section transition curve 81a, an arc-shaped curve 81b, and a deceleration section transition curve 81c, is generated on the basis of the vehicle information 183 as illustrated in FIG. 17A. The reference single-side steering maneuver curve 81 is determined on the basis of the relative angle θt between the vehicle orientation Vf of the vehicle V at the current position Pa and the vehicle orientation Vf of the vehicle V at the candidate connection position Pcn as illustrated in FIG. 17B.

The acceleration section transition curve 81a and the deceleration section transition curve 81c are each computed on the basis of a target steering speed and a target vehicle speed. The arc-shaped curve 81b has the minimum turning radius of the vehicle V set thereon, and the length of the arc-shaped curve 81b is set such that the vehicle orientation Vf at an end of the acceleration section transition curve 81a becomes parallel with the vehicle orientation Vf at the current position Pa. Then, a reference reachable position 82 that can be reached by the vehicle V from the candidate connection position Pcn using the reference single-side steering maneuver connection curve 81 is computed.

Next, as illustrated in FIG. 17C, on the coordinate system having the current position Pa as the origin, the distance ΔPcy in the horizontal axis direction between the Y-coordinates of the candidate connection position Pcn and the current position Pa, and the distance ΔKy in the horizontal axis direction between the Y-coordinates of the reference reachable position 82 and the current position Pa are computed, and a magnification is computed on the basis of ΔPcy/ΔKy. This magnification is referred to as an Y-coordinate reachable magnification. In addition, a position obtained by magnifying the values of the X-coordinate and the Y-coordinate of the reference reachable position 82 on the basis of the Y-coordinate reachable magnification is referred to as a magnified reachable position 83. Further, a curve obtained by magnifying the reference single-side steering maneuver curve 81 by the Y-coordinate reachable magnification is referred to as a magnified curve 84.

The connection path computing unit 13 computes the Y-coordinate reachable magnification on the basis of the ratio of the distance ΔPcy in the horizontal axis direction from the current position Pa of the vehicle V to the candidate connection position Pcn to the distance ΔKy in the horizontal axis direction of the reference single-side steering maneuver curve 81. Then, the connection path computing unit 13 computes the magnified curve 84 by magnifying and deforming the reference curve through a similarity transformation on the basis of the Y-coordinate reachable magnification. Herein, a characteristic that the inclination of the tangent at the reachable position remains the same even when the curve is magnified through a similarity transformation is used for each of the arc-shaped curve and the clothoid curve.

Finally, as illustrated in FIG. 17D, on the coordinate system having the current position Pa as the origin, the distance Δx to the X-coordinate of the magnified reachable position 83 is computed, and is determined as the length of a straight line 85. Connecting the straight line 85 and the magnified curve 84 can form a connection path 86. Thus, the magnified curve 84 partially forms the connection path 86. With this method, the connection path 86 for which a transition curve that requires only a single-side steering maneuver is used can be generated. The candidate connection position Pcn, with which the connection path 86 can be generated by the connection path computing unit 13 among the plurality of candidate connection positions Pcn, is set as the park-out position Pe.

FIGS. 18A, 18B, 18C, and 18D illustrate a method of generating a connection path using a transition curve that requires an S-turn steering maneuver. A method of computing a driving path from the current position Pa of the vehicle V to the candidate connection position Pcn is basically the same as the method of generating a connection path using a transition curve that requires only a single-side steering maneuver illustrated in FIGS. 17A, 17B, 17C, and 17D. The computation method herein differs from that in FIGS. 17A, 17B, 17C, and 17D in that, as illustrated in FIG. 18A, a reference S-turn steering maneuver curve 91 is formed using an acceleration section transition curve 91a, an arc-shaped curve 91b, an acceleration section transition curve 91c, an arc-shaped curve 91d, and a deceleration section transition curve 91e, and in that, regarding the difference in the relative angle of the vehicle orientation Vf, the relative angle of the vehicle orientation Vf changes by the same degree on the two curves making up the S-shaped curve.

To generate a path from the current position Pa of the vehicle V to the candidate connection position Pcn that requires an S-turn steering maneuver, first, as illustrated in FIG. 18A, a reference S-turn steering maneuver curve 91, which is obtained by adding together the acceleration section transition curve 91a, the arc-shaped curve 91b, the acceleration section transition curve 91c, the arc-shaped curve 91d, and the deceleration section transition curve 91e, is generated on the basis of the vehicle information 183. The reference S-turn steering maneuver curve 91 is computed on the basis of the vehicle orientation Vf of the vehicle V at the current position Pa and the vehicle orientation Vf of the vehicle V at the candidate connection position Pcn as illustrated in FIG. 18B.

The acceleration section transition curves 91a and 91c and the deceleration section transition curve 91e are computed on the basis of a target steering speed and a target vehicle speed. The arc-shaped curves 91b and 91d each have set thereon the minimum turning radius of the vehicle V. The lengths of the arc-shaped curves 91b and 91d are set equal so that the turning angles for a right turn and a left turn of the vehicle V become equal. In addition, a reference reachable position 92 that can be reached by the vehicle V from the candidate connection position Pcn using the reference S-turn steering maneuver curve 91 is computed.

Next, as illustrated in FIG. 18C, on the coordinate system having the current position Pa as the origin, the distance ΔPcy in the horizontal axis direction between the Y-coordinates of the candidate connection position Pcn and the current position Pa, and the distance ΔKy in the horizontal axis direction between the Y-coordinates of the reference reachable position 92 and the current position Pa are computed, and an Y-coordinate reachable magnification is computed on the basis of ΔPcy/ΔKy. Then, a position obtained by magnifying the values of the X-coordinate and the Y-coordinate of the reference reachable position 92 on the basis of the Y-coordinate reachable magnification is set as a magnified reachable position 93, and a curve obtained by magnifying the reference S-turn steering maneuver curve 91 by the Y-coordinate reachable magnification is set as a magnified curve 94.

The connection path computing unit 13 computes the Y-coordinate reachable magnification on the basis of the ratio of the distance ΔPcy in the horizontal axis direction from the current position Pa of the vehicle V to the candidate connection position Pcn to the distance ΔKy in the horizontal axis direction of the reference S-turn steering maneuver curve 91. Then, a characteristic that the inclination of the tangent at the reachable position remains the same even when the curve is magnified through a similarity transformation is used for each of the arc-shaped curve and the clothoid curve.

Finally, as illustrated in FIG. 18D, on the coordinate system having the current position Pa as the origin, the distance Δx to the X-coordinate of the magnified reachable position 93 is computed, and is determined as the length of a straight line 95. Connecting the straight line 95 and the magnified curve 94 can form a connection path 96. Thus, the magnified curve 94 partially forms the connection path 96. With this method, the connection path 96 for which a transition curve that requires an S-turn steering maneuver is used can be generated. The candidate connection position Pcn, with which the connection path 96 can be generated by the connection path computing unit 13 among the plurality of candidate connection positions Pcn, is set as the park-out position Pe.

It should be noted that in the present method, it is often the case that the reference reachable position 92 is set at a position away from the current position Pa of the vehicle V in the Y-coordinate direction since the turning radius is too small, and thus, a connection path cannot be computed. In the present embodiment, in such a case, a known method such as the one disclosed in JP 2017-081398 A is used to geometrically compute a turning radius and a change in the angle, and then, a method of comprehensively searching for a connection path using values around the value of the turning radius while changing the turning radius is adopted.

According to the parking control device 1 of the present embodiment, the acceleration section transition curve is computed using the acceleration section target vehicle speed, and the deceleration section transition curve is computed using the deceleration section target vehicle speed. The deceleration section target vehicle speed is set faster than the acceleration section target vehicle speed. Thus, the length of the deceleration section transition curve is shorter than that of the acceleration section transition curve. Therefore, since the amount of change in the steering angle relative to the travel distance during acceleration of the vehicle has a gentle slope, it is possible to prevent the steering speed from becoming too fast. Meanwhile, since the amount of change in the steering angle relative to the travel distance during deceleration of the vehicle has a steep slope, it is possible to prevent the steering speed from becoming too slow and thus prevent the movement of the steering wheel from becoming too slow. Further, since the length of the deceleration section is shorter than that of the acceleration section, the length of the resulting parking path can be made shorter than that with the conventional device.

Although the aforementioned embodiment illustrates an example in which reverse parking is assisted, the present invention is similarly applicable to assisting in front-in parking. A parking path for front-in parking also includes an acceleration section for accelerating the vehicle speed from the initial position, a constant speed section for turning the vehicle at a constant speed, and a deceleration section for decelerating the vehicle speed until the vehicle reaches a target parking position. Regarding an acceleration section transition curve computed using an acceleration section target vehicle speed and a deceleration section transition curve computed using a deceleration section target vehicle speed, the deceleration section target vehicle speed is set faster than the acceleration section target vehicle speed. Thus, the length of the deceleration section transition curve is shorter than that of the acceleration section transition curve. Therefore, since the amount of change in the steering angle relative to the travel distance during acceleration of the vehicle has a gentle slope, it is possible to prevent the steering speed from becoming too fast. Meanwhile, since the amount of change in the steering angle relative to the travel distance during deceleration of the vehicle has a steep slope, it is possible to prevent the steering speed from becoming too slow and thus prevent the movement of the steering wheel from becoming too slow. Further, since the length of the deceleration section is shorter than that of the acceleration section, the length of the resulting parking path can be made shorter than that with the conventional device.

Although the embodiments of the present invention have been described in detail above, the present invention is not limited thereto, and various design changes can be made without departing from the spirit or scope of the present invention recited in the claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

Although the aforementioned embodiments illustrate a case where the vehicle is automatically parked, the present invention is also applicable to a steering wheel operation during autonomous driving of a vehicle, for example. In such a case, a target vehicle position is set instead of the target parking position, a movement path is set instead of the pull-out path, and a driving path is set instead of the parking path, so that the driving path up to the target vehicle position is computed.

DESCRIPTION OF SYMBOLS

1 Parking control device (autonomous driving control device)
11 Transition curve computing unit
12 Candidate connection position setting unit
13 Connection path computing unit
14 Parking path generating unit (driving path generating unit)
15 Vehicle control device
16 Display unit
20 Parking space
21 Road
22, 23, 24 Obstacle
25 Road orientation
26 Parking orientation
V Vehicle
Vo Reference point (Position of vehicle)
P0 Initial position
P1 Target parking position (Target vehicle position)
Pa Current position Pcn Candidate connection position
Pe Park-out position
B Pull-out path (movement path)
D Straight movement distance to be added

What is claimed is:

1. An autonomous driving control device for computing and executing a driving path along which a vehicle is driven autonomously, comprising:
   one or more processors and one or more non-transitory computer-readable storage media, the non-transitory computer-readable storage media having stored thereon at least an acceleration section transition curve computing unit and a deceleration section transition curve computing unit;
   the acceleration section transition curve computing unit configured to compute an acceleration section transition curve on the basis of a target steering speed set in advance and an acceleration section travel distance; and
   the deceleration section transition curve computing unit configured to compute a deceleration section transition curve on the basis of the target steering speed and a deceleration section travel distance,
   wherein:
   a driving path is computed by setting the deceleration section travel distance to be shorter than the acceleration section travel distance and the non-transitory computer-readable storage media having further stored thereon instructions for executing the driving path.

2. The autonomous driving control device according to claim 1, further comprising the non-transitory computer-readable storage media having stored thereon:
   a candidate connection position setting unit configured to compute a movement path for moving the vehicle from a target vehicle position using the deceleration section transition curve, and set a candidate connection position on the movement path using the acceleration section transition curve;
   a connection path computing unit configured to compute a connection path that allows the vehicle to reach the candidate connection position from an initial position of the vehicle using the acceleration section transition curve and the deceleration section transition curve; and
   a driving path generating unit configured to generate the driving path by connecting the movement path and the connection path.

3. The autonomous driving control device according to claim 2,
   wherein:
   the driving path includes an arc-shaped curve, and
   a minimum turning radius of the vehicle is set as a radius of curvature of the arc-shaped curve.

4. The autonomous driving control device according to claim 2,
   wherein:
   the connection path computing unit is configured to
      compute a reference curve including the acceleration section transition curve and the deceleration section transition curve on the basis of a relative angle between a vehicle orientation at a position of the vehicle and a vehicle orientation at the candidate connection position,
      compute a magnified curve by, on a coordinate system having a position of the vehicle as an origin, magnifying and deforming the reference curve through a similarity transformation on the basis of a ratio of a distance in a horizontal axis direction from the position of the vehicle to the candidate connection position to a distance in the horizontal axis direction of the reference curve, and
      compute the connection path using the magnified curve.

5. The autonomous driving control device according to claim 2, wherein regarding the acceleration section transition curve and the deceleration section transition curve included in the connection path, a length of the deceleration section transition curve is shorter than that of the acceleration section transition curve.

6. The autonomous driving control device according to claim 2, wherein regarding the acceleration section transition curve and the deceleration section transition curve included in the movement path, a length of the deceleration section transition curve is shorter than that of the acceleration section transition curve.

7. An autonomous driving path computation method for computing and executing a driving path including an acceleration section transition curve and a deceleration section transition curve, the method comprising:
   computing an acceleration section transition curve on the basis of a target steering speed set in advance and an acceleration section travel distance, and
   computing a deceleration section transition curve on the basis of the target steering speed and a deceleration section travel distance that is set shorter than the acceleration section travel distance; and
   executing the driving path.

8. The autonomous driving path computation method according to claim 7, comprising:
   a first step of computing a movement path for moving the vehicle from a target vehicle position;
   a second step of computing a connection path that connects an initial position of the vehicle to a candidate connection position set on the movement path; and
   a third step of computing a driving path for moving the vehicle from the initial position of the vehicle to the target vehicle position using the movement path and the connection path,
   wherein:
   the first step includes computing the movement path using the acceleration section transition curve, the deceleration section transition curve, and an arc-shaped curve.

9. The autonomous driving path computation method according to claim 8, wherein the first step includes changing a length of the arc-shaped curve to set a plurality of candidate connection positions on the movement path.

10. The autonomous driving path computation method according to claim 8, wherein the second step includes computing a reference curve using the acceleration section transition curve, the deceleration section transition curve, and the arc-shaped curve, magnifying and deforming the reference curve through a similarity transformation, and using the magnified, deformed reference curve as a part of the connection path.

11. An autonomous driving control device for computing and executing a driving path along which a vehicle is driven autonomously, comprising:
   one or more processors and one or more non-transitory computer-readable storage media, the non-transitory computer-readable storage media having stored thereon at least an acceleration section transition curve computing unit, a deceleration section transition curve computing unit, a candidate connection position setting unit, a connection path computing unit and a driving path generating unit;

the acceleration section transition curve computing unit configured to compute an acceleration section transition curve on the basis of a target steering speed set in advance and an acceleration section travel distance; and the deceleration section transition curve computing unit configured to compute a deceleration section transition curve on the basis of the target steering speed and a deceleration section travel distance;

the candidate connection position setting unit configured to compute a movement path for moving the vehicle from a target vehicle position using the deceleration section transition curve, and set a candidate connection position on the movement path using the acceleration section transition curve;

the connection path computing unit configured to compute a connection path that allows the vehicle to reach the candidate connection position from an initial position of the vehicle using the acceleration section transition curve and the deceleration section transition curve; and the driving path generating unit configured to generate the driving path by connecting the movement path and the connection path, wherein:

a driving path is computed by setting the deceleration section travel distance speed to be shorter than the acceleration section travel distance;

wherein regarding the acceleration section transition curve and the deceleration section transition curve included in the connection path or the movement path, a length of the deceleration section transition curve is shorter than that of the acceleration section transition curve and the non-transitory computer-readable storage media having further stored thereon instructions for executing the driving path.

* * * * *